United States Patent
Haque et al.

(10) Patent No.: US 8,243,798 B2
(45) Date of Patent: Aug. 14, 2012

(54) METHODS AND APPARATUS FOR SCALABLE VIDEO BITSTREAMS

(75) Inventors: Munsi A. Haque, San Jose, CA (US); Prasanna Singamsetty, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1637 days.

(21) Appl. No.: 11/642,180

(22) Filed: Dec. 20, 2006

(65) Prior Publication Data

US 2008/0152002 A1    Jun. 26, 2008

(51) Int. Cl.
  *H04N 7/32* (2006.01)
  *H04N 7/26* (2006.01)
(52) U.S. Cl. .............................. 375/240.12; 375/240.03
(58) Field of Classification Search .................. None
  See application file for complete search history.

(56) References Cited

U.S. PATENT DOCUMENTS

| | | | |
|---|---|---|---|
| 6,633,677 B1 | 10/2003 | Dube et al. | |
| 6,782,143 B1 | 8/2004 | Dube et al. | |
| 7,082,516 B1 | 7/2006 | Tomazin et al. | |
| 7,095,342 B1 | 8/2006 | Hum et al. | |
| 7,100,029 B2 | 8/2006 | Zou et al. | |
| 7,129,864 B2 | 10/2006 | Jahanghir et al. | |
| 2005/0185714 A1* | 8/2005 | Lin et al. | 375/240.12 |
| 2006/0083308 A1* | 4/2006 | Schwarz et al. | 375/240.16 |
| 2006/0120452 A1 | 6/2006 | Li | |
| 2006/0133494 A1 | 6/2006 | Saxena et al. | |
| 2006/0133510 A1 | 6/2006 | Saxena et al. | |
| 2006/0136457 A1* | 6/2006 | Park et al. | 707/101 |
| 2006/0145898 A1 | 7/2006 | Jahanghir et al. | |
| 2006/0193379 A1* | 8/2006 | Ridge et al. | 375/240.01 |
| 2006/0222067 A1* | 10/2006 | Park et al. | 375/240.08 |
| 2006/0233246 A1* | 10/2006 | Park et al. | 375/240.12 |
| 2007/0140350 A1* | 6/2007 | Sakazume et al. | 375/240.21 |
| 2008/0002767 A1* | 1/2008 | Schwarz et al. | 375/240.12 |

OTHER PUBLICATIONS

Combined scalability support for the scalable extension of H.264/AVC, Schwarz H., Marpe D., Schierl T., Wiegand T., Jul. 2005, Multimedia and Expo 2005 ICME 2005 IEEE International Conferenc on, p. 4 pp.*

"MPEG-2 Video Standard Specification", ISO/IEC 13818-2: 1995 (E), Recommendation ITU-T H.262 (1995 E). 248 pages. (The specification of the document includes but is not limited to sections 7.7 (Spatial Scalability), 7.8 (SNR Scalability), 7.9 (Temporal Scalability) and 7.11 (Hybrid Scalability)).

* cited by examiner

*Primary Examiner* — Thai Tran
*Assistant Examiner* — Sunghyoun Park
(74) *Attorney, Agent, or Firm* — Buckley, Maschoff & Talkwalker LLC

(57) ABSTRACT

In some embodiments, a method includes generating a first image data frame, a first error image data frame and a second error image data frame based at least in part on a bitstream. The method further includes upscaling or de-quantizing the first image data frame to provide a first predicted image data frame, generating a second image data frame based at least in part on the first predicted image data frame and the first error image data frame, upscaling or de-quantizing the second image data frame to provide a second predicted image data frame, and generating a third image data frame based at least in part on the second predicted image data frame and the second error image data frame. In some embodiments, an apparatus includes a storage medium having stored instructions that when executed by a machine result in the method.

39 Claims, 15 Drawing Sheets

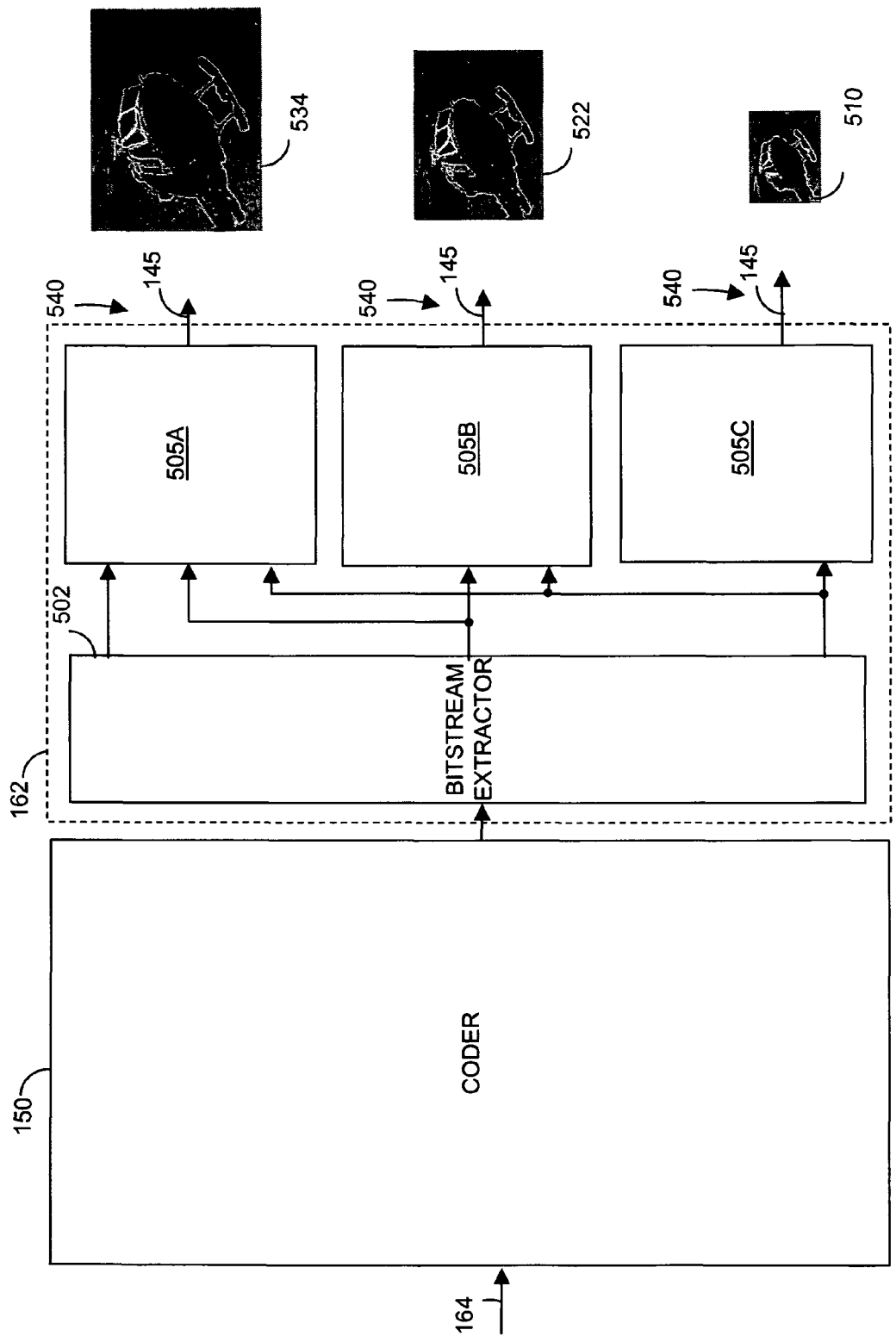

METHODS AND APPARATUS FOR SCALABLE VIDEO BITSTREAMS

BACKGROUND

The Joint Scalable Video Coding (JSVC) standard offers the capability for greater video scalability than either the MPEG-2 standard or the Advanced Video Coding (AVC)-H.264 video coding standard. For at least this reason, the JSVC video coding standard is expected to supersede the MPEG-2 standard and/or the AVC-H.264 video coding standard for many applications that require video scalability.

The JSVC standard employs video coding techniques currently employed in the AVC-H.264 video coding standard, as well as additional video coding techniques not currently employed in the AVC-H.264 video coding standard.

Many existing devices, e.g., portable data assistants (PDA's) may employ the AVC-H.264 video coding standard but do not support the additional video coding techniques employed in the new JSVC video coding standard. Consequently, such devices are not able to support the JSVC video coding standard.

BRIEF DESCRIPTION OF THE DRAWINGS

FIG. 15 is functional block diagram of the coder of FIG. 1 and the decoder of FIG. 1, according to some embodiments.

DETAILED DESCRIPTION

Figure 1:
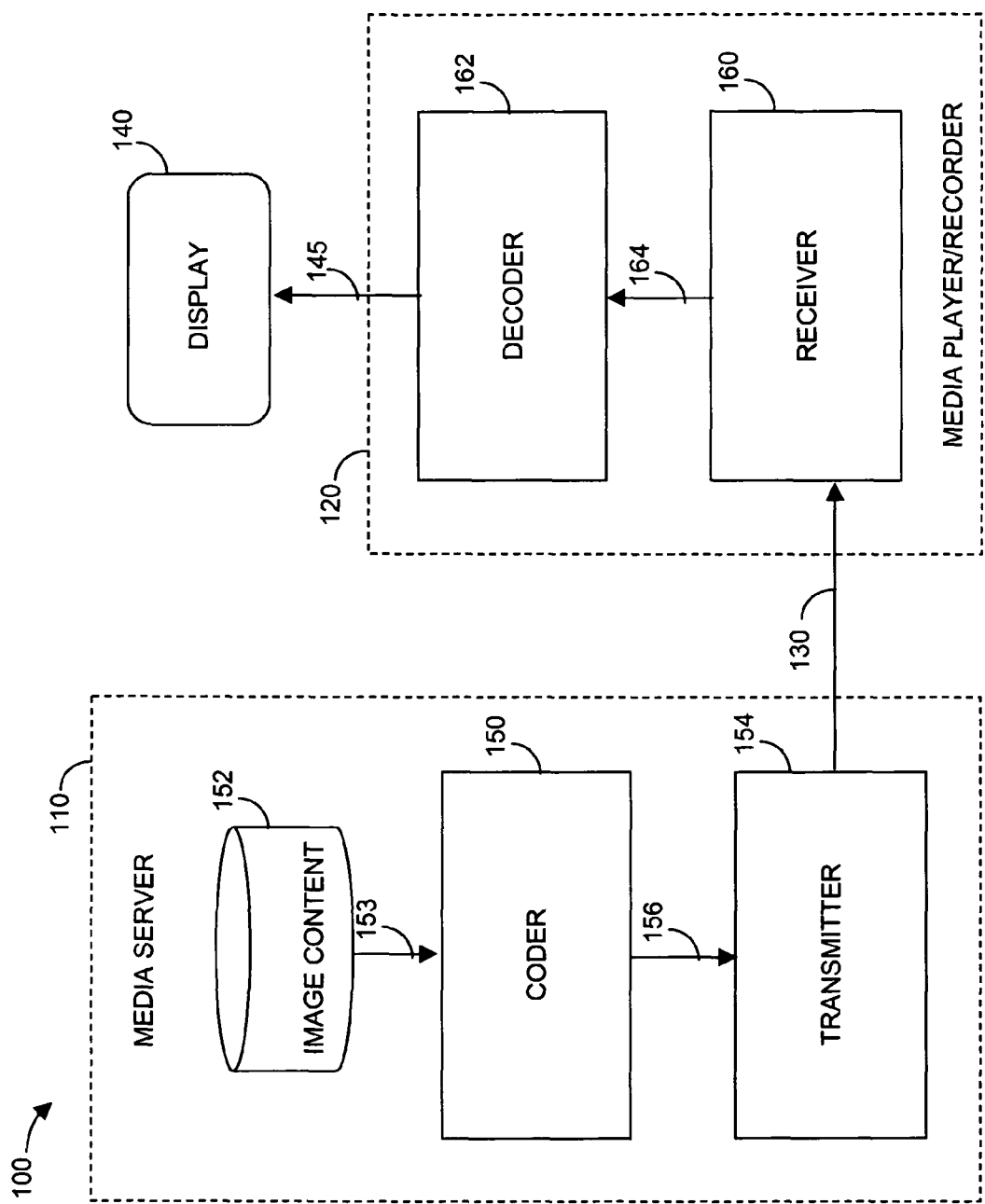
FIG. 1 is a block diagram of a media system 100, according to some embodiments.

FIG. 1 is a block diagram of a media system 100, according to some embodiments. The media system 100 includes a media server 110 that provides information to a remote media player/recorder 120, for example, through a first communication link 130. The media player/recorder 120 may receive the information provided by the media server 110 and may store information and/or provide information to a display device 140, e.g., through a second communication link 145.

The media server 110 includes a coder 150 in accordance with some embodiments. The coder 150 may include, but is not limited to, a coding component. The coder 150 may be coupled to a source of media content 152, e.g., through a third communication link 153, and may receive media content from the source of media content 152 through the third communication link 153. The source of media content 152 may include, but is not limited to, a source of image data frames, e.g., a video camera, a tele-cine, a digital video tape reproducing device, etc. In that regard, media content may include, but is not limited to, information representing one or more images, e.g., a sequence of image data frames.

The coder 150 may be coupled to a transmitter 154 through a fourth communication link 156. The transmitter 154 may receive coded image data from the coder 150 through the fourth communication link 156. The transmitter 154 may be coupled to the first communication link 130 and may supply the coded media data thereto. The first communication link 130 may operate to transmit the coded media content to the media player/recorder 120. In some embodiments, the data may be transmitted by the transmitter 116 as a stream of image information.

The media player/recorder 120 includes a receiver 160 that is coupled to the first communication link 130 and may receive the coded media data therefrom. The receiver 160 may be coupled to a decoder 162 through a fifth communication link 164 and may supply the coded media data to the decoder 162 through the fifth communication link 164.

The media player/recorder may supply information to the display device 140 and/or store information (coded and/or decoded) on a recording medium (not shown). For example, a Digital Video Recorder (DVR) might retrieve locally stored image information, or a set-top box might receive a stream of image information from a remote device (e.g., a content provider might transmit a stream that includes high-definition image frames to the set-top box through a cable or satellite network).

As used herein, a communication link may comprise any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

As used herein, information may be encoded and/or decoded in accordance with any of a number of different protocols. For example, image information may be processed in connection with International Telecommunication Union—Telephony and Telegraphy (ITU-T) recommendation H.264 entitled "Advanced Video Coding for Generic Audiovisual Services" (2004) or the International Organization for Standardization (ISO)/International Engineering Consortium (IEC) Motion Picture Experts Group (MPEG) standard entitled "Advanced Video Coding (Part 10)" (2004). As other examples, image information may be processed in accordance with ISO/IEC document number 14496 entitled "MPEG-4 Information Technology—Coding of Audio-Visual Objects" (2001) or the MPEG2 protocol as defined by ISO/IEC document number 13818-1 entitled "Information Technology—Generic Coding of Moving Pictures and Associated Audio Information" (2000).

Consider, for example, AVC-H.264 image information. An image may be divided into a number of "macroblocks". Moreover, each macroblock may be subdivided, if it is advantageous to do so. Information about one macroblock may be encoded using information about neighboring macroblocks (e.g., because neighboring macroblocks may frequently have similar characteristics). When a particular macroblock is being decoded and/or decompressed, information about that macroblock may be derived using a predicted value from one or more neighboring blocks. Each macroblock, whether or not subdivided, may be encoded in either an "intra" or "inter" mode (i.e., either intraframe or interframe prediction).

Figure 2:
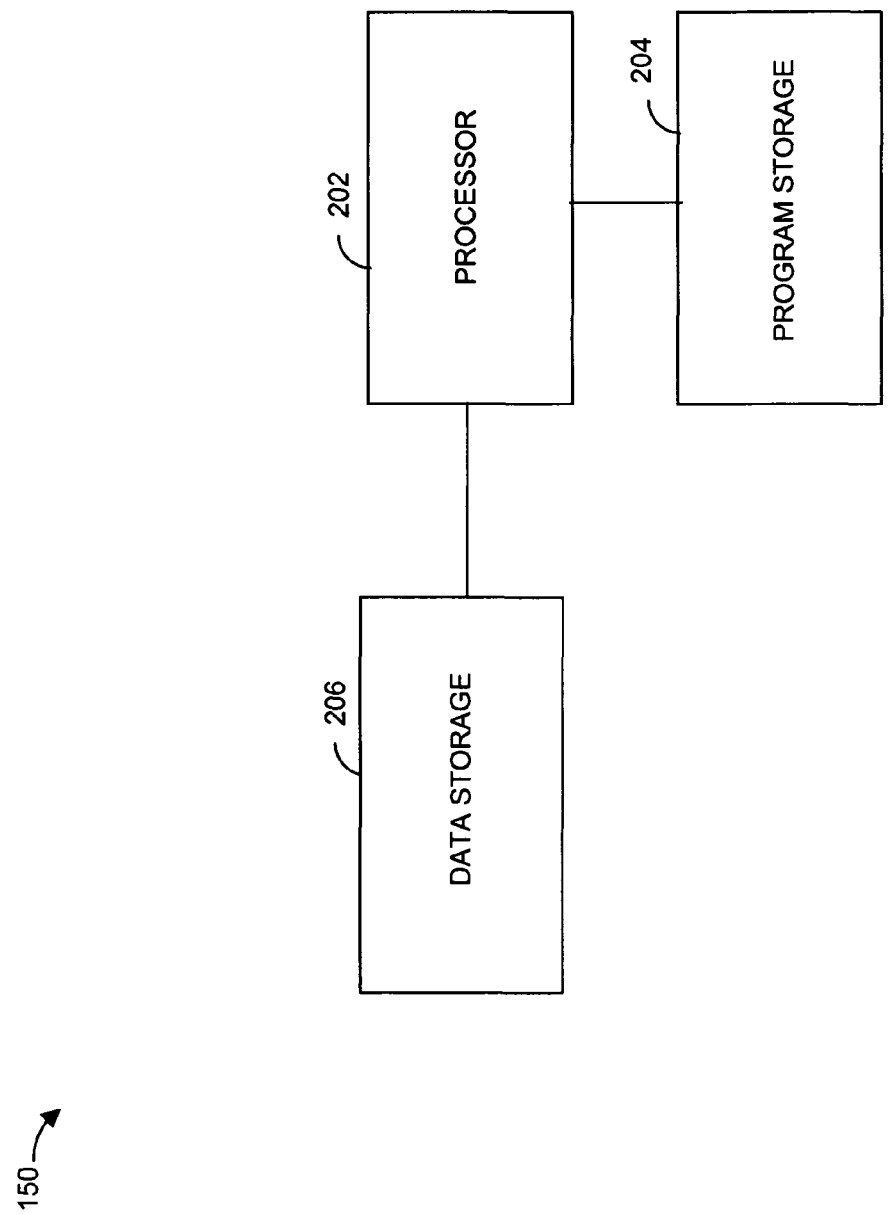
FIG. 2 is a block diagram of a coder of the system of FIG. 1, according to some embodiments.

FIG. 2 is a block diagram of the coder 150 according to some embodiments. Referring to FIG. 2, in some embodiments, the coder 150 includes a processor 202, a program storage device 204 and a data storage device 206. The program storage device 204 and the data storage device 206 may each be coupled to the processor 202. The processor 202 may include, but is not limited to, for example, a general purpose processor (e.g., a general purpose microprocessor) and/or a digital signal processor (DSP). The program storage device 204 may store program instructions that may be executed by the processor to cause the processor 202 to perform image data coding in accordance with some embodiments, as described below. The data storage device 206 may store data and/or may be used as working memory and may include, but is not limited to, for example, random access memory (RAM). In some embodiments, the program storage device 204 stores data in addition to instructions. In some embodiments, the data storage device 206 stores instructions in addition to data. In some embodiments, a single storage device serves as the program storage device 204 and the data storage device 206.

A processor may be implemented in any manner. For example, a processor may be programmable or non programmable, general purpose or special purpose, dedicated or non dedicated, distributed or non distributed, shared or not shared, and/or any combination thereof. If the processor has two or more distributed portions, the two or more portions may communicate with one another via a communication system. A processor may include, for example, but is not limited to, hardware, software, firmware, hardwired circuits and/or any combination thereof.

In some embodiments, the coder 150 may be implemented as an application specific integrated circuit (ASIC) configured to perform image data coding in accordance with some embodiments, as described below.

As described hereinafter, in some embodiments, a scalable bitstream may be employed even in association with devices that are not able to employ the JSVC video coding standard.

Figure 3:
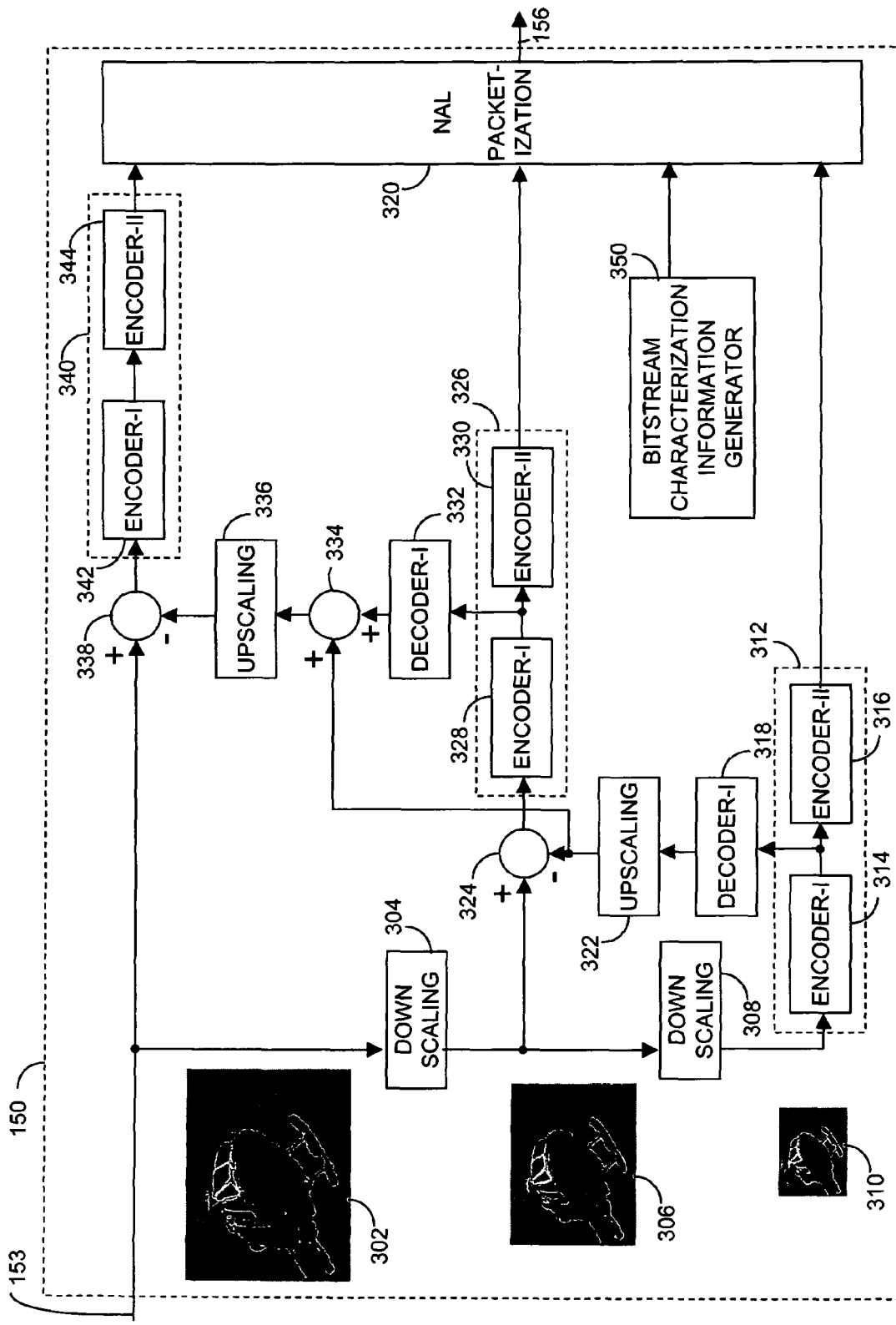
FIG. 3 is a functional block diagram of the coder of FIG. 1, according to some embodiments.

FIG. 3 is a functional block diagram of the coder 150 in accordance with some embodiments. Referring to FIG. 3, in some embodiments, the coder 150 receives an input or first image data frame indicated at 302. The input image data frame 302 may have a first resolution, e.g., 704 pixels×480 pixels (i.e., standard definition (SD)), and may be supplied from a source of media content, including, but not limited to, for example, an image capture device (e.g., a camera), an image storage device, an image retrieval device and/or combinations thereof (e.g., a digital video recorder (DVR) that might retrieve stored image information).

The input image data frame 302 may be supplied to an input of a first downscaler 304, the output of which may supply a second image data frame indicated at 306. The first downscaler 304 may provide downscaling, e.g., 2×2 downscaling, such that the second image data frame 306 has a second resolution, e.g., 352 pixels×240 pixels (i.e., common interchange format (CIF)). The first downscaler 304 may include, but is not limited to, for example, a pre-processing filter and/or a spatial filter.

The second image data frame 306 may be supplied to an input of a second downscaler 308, the output of which may supply a third image data frame indicated at 310. The second downscaler 308 may provide downscaling, e.g., 2×2 downscaling, such that the third image data frame 310 has a third resolution, e.g., 176 pixels×120 pixels (i.e., quarter common interchange format (QCIF)). The second downscaler 308 may include, but is not limited to, for example, a pre-processing filter and/or a spatial filter.

The third image data frame 310 may be supplied to an input of a first encoder 312, which may provide coding in accordance with one or more video coding standards, e.g., the AVC-H.264 video coding standard. In some embodiments, the first encoder 312 includes a first portion 314 and a second portion 316, which may provide lossy coding and lossless coding, respectively. The second portion 316 of the first encoder 312 may include, but is not limited to, an entropy encoder, e.g., a Huffman coder.

The output of the second portion 316 of the first encoder 312 may supply a coded image data frame, which may represent a first or base layer, i.e., layer 0, of a bitstream to be provided by the coder 150. The coded image data frame supplied by the second portion 316 may be supplied to a first input of a packetizer 320, further described hereinafter.

The output of the first portion 314 of the first encoder 312 may supply a coded image data frame, which may be supplied to a first decoder 318. The first decoder 318 may provide decoding in accordance with one or more video coding standards, e.g., the AVC-H.264 video coding standard. In some embodiments, the first decoder 318 provides decoding in accordance with the same video coding standard(s) as the first portion 314 of the first encoder 312.

The output of the first decoder 318 may supply a first decoded image data frame, which may have a resolution equal to the third resolution, e.g., 176 pixels×120 pixels. The first decoded image data frame may be supplied to an input of a first upscaler 322, the output of which may supply a first predicted image data frame. The first upscaler 322 may provide upscaling, e.g., 2×2 upscaling, such that the first predicted image data frame has the second resolution, e.g., 352 pixels×240 pixels.

The first predicted image data frame supplied by the first upscaler 322 may be supplied to a first input of a first subtractor 324, a second input of which may receive the second image data frame 306. The first subtractor 324 may supply a first error image data frame, which may represent differences between the second image data frame 306 and the first predicted image data frame. The first error image data frame may have a resolution equal to the second resolution, e.g., 352 pixels×240 pixels.

The first error image data frame supplied by the first subtractor 324 may be supplied to an input of a second encoder 326, which may provide coding in accordance with one or more video data coding standards, e.g., the AVC-H.264 video coding standard. In some embodiments, the second encoder 326 provides coding in accordance with the same video coding standard(s) as the first encoder 312. In some embodiments, the second encoder 326 includes a first portion 328 and a second portion 330, which may provide lossy coding and lossless coding, respectively. The second portion 330 of the second encoder 326 may include, but is not limited to, an entropy encoder, e.g., a Huffman coder.

The output of the second portion 330 of the second encoder 326 may supply a coded first error image data frame, which may represent a second layer, i.e., layer 1, of a bitstream to be provided by the coder 150. The coded first error image data frame supplied by the second portion 316 may be supplied to a second input of the packetizer 320, further described hereinafter.

The output of the first portion 314 of the second encoder 326 may supply a coded first error image data frame, which may be supplied to a second decoder 332. The second decoder 332 may provide decoding in accordance with one or more video coding standards, e.g., the AVC-H.264 video coding standard. In some embodiments, the second decoder 332 provides decoding in accordance with the same video coding standard(s) as the first decoder 318 and/or the second encoder 326.

The output of the second decoder 332 may supply a decoded error image data frame, which may have a resolution equal to the second resolution, e.g., 352 pixels×240 pixels. The decoded error image data frame may be supplied to a first input of a first adder 334, a second input of which may receive the first predicted image data frame. The first adder 334 may supply an adjusted data frame, which may represent a combination of the decoded error image data frame and the first predicted image data frame. The adjusted data frame may have a resolution equal to the second resolution, e.g., 352 pixels×240 pixels.

The adjusted data frame supplied by the first adder 334 may be supplied to an input of a second upscaler 336, the output of which may supply a second predicted image data frame. The second upscaler 336 may provide upscaling, e.g., 2×2 upscaling, such that the second predicted image data frame has a resolution equal to the first resolution, e.g., 704 pixels×480 pixels. The second predicted image data frame supplied by the second upscaler 336 may be supplied to a first input of a second subtractor 338, a second input of which may receive the input or first image data frame 306. The second subtractor 338 may supply a second error image data frame, which may represent differences between the input or first image data frame 306 and the second predicted image data frame. The second error image data frame may have a resolution equal to the first resolution, e.g., 704 pixels×480 pixels.

The second error image data frame supplied by the second subtractor 338 may be supplied to an input of a third encoder 340, which may provide coding in accordance with one or more video coding standards, e.g., the AVC-H.264 video coding standard. In some embodiments, the third encoder 340 provides coding in accordance with the same video coding standard(s) as the first encoder 312 and/or the second encoder 326. In some embodiments, the third encoder 340 includes a first portion 342 and a second portion 344, which may provide lossy coding and lossless coding, respectively. The second portion 344 of the third encoder 340 may include, but is not limited to, an entropy encoder, e.g., a Huffman coder. The output of the third encoder 340 may supply a coded second error image data frame, which may represent a third layer, i.e., layer 2, of a bitstream to be provided by the coder 150. The coded second error image data frame supplied by the third encoder 340 may be supplied to a third input of the packetizer 320.

The coder 150 may further include a bitstream characterization information generator 350, which may determine and/or provide information (referred to herein as bitstream characterization information) that may be used by a decoder, e.g., the decoder 162 (FIG. 3), in processing the bitstream. Thus, bitstream characterization information may include, but is not limited to, any type of information that may be used by the decoder 162 to control any portion of the decoder 162. In some embodiments, the bitstream characterization information includes information that indicates, directly or indirectly, the resolution and/or other characteristic(s) of one or more layers.

The bitstream characterization information may be supplied to the packetizer 320. The packetizer 320 may generate a packetized bitstream in accordance with one or more standards. The bitstream may include and/or may be based at least in part on the coded image data frame (representing the first or base layer), the coded first error image data frame (representing the second layer), and the coded second error image data frame (representing the third layer) supplied to the packetizer 320. In some embodiments, the bitstream also includes the bitstream characterization information. The packetizer 320 may include not limited to, a network abstraction layer (NAL) packetizer.

The coder 150 may or may not be programmable. In some embodiments, one or more characteristics of the coder 150 are programmable. In some such embodiments, one or more of the downscalers 304, 308, and/or one or more of the upscalers 322, 326, are programmable. Moreover, in some embodiments, one or more of the encoders 312, 326, 344 and/or one or more of the decoders 318, 332 are programmable.

Some embodiments may have a configuration that does not include one or more of the downscalers 304, 308, upscalers 322, 326, encoders 312, 326, 344 and/or decoders 318, 332 and/or a configuration that includes one or more structures not employed in the coder 150 of FIG. 3. In some embodiments, encoders 312, 326, 340 each provide coding in accordance with the AVC-H.264 video coding standard, and decoders 318, 322 each provide decoding in accordance with the same video data coding standard, e.g., the AVC-H.264 video coding standard. In addition, in some embodiments, the downscalers 304, 308 each provide 2×2 downscaling and the upscalers 322, 336 each provide 2×2 upscaling.

Figure 4:
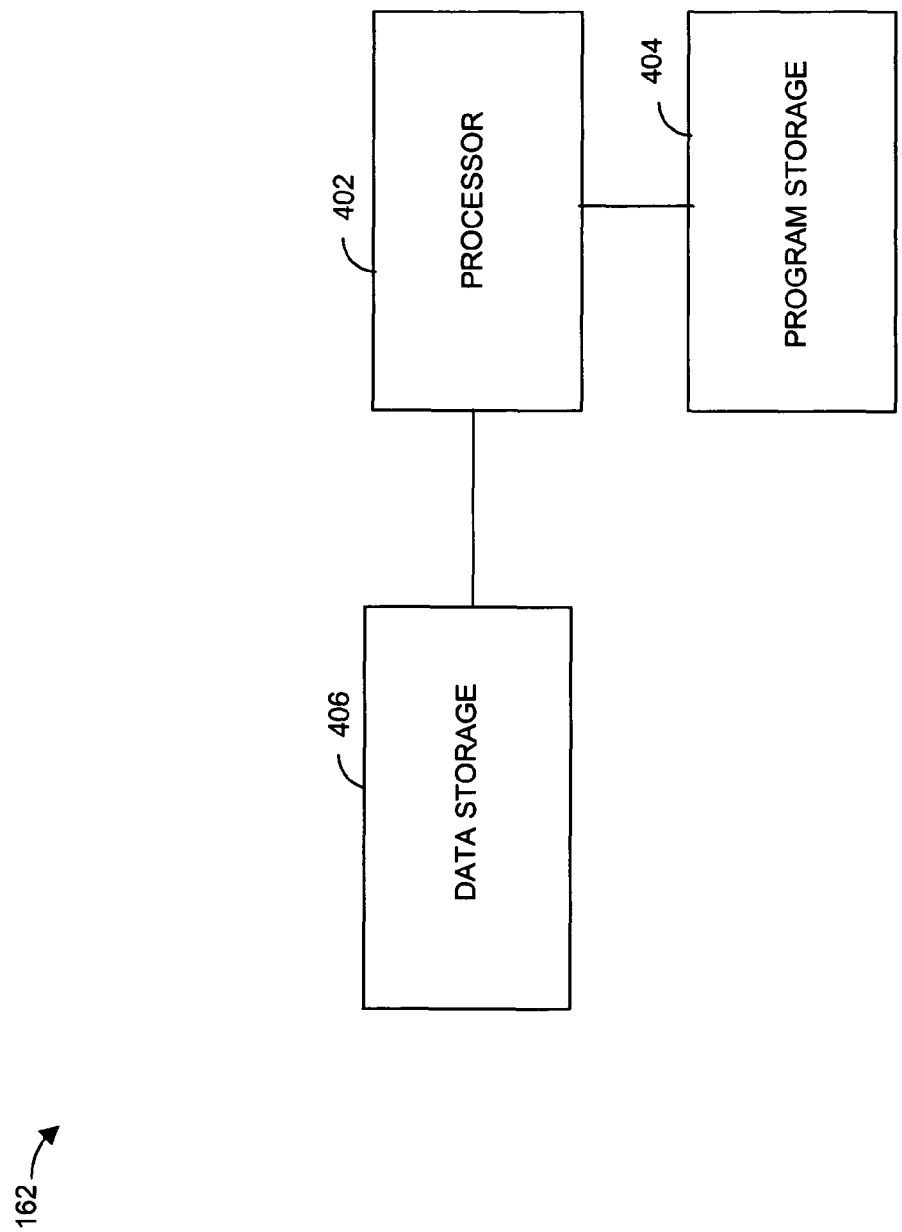
FIG. 4 is a block diagram of a decoder of the system of FIG. 1, according to some embodiments.

FIG. 4 is a block diagram of the decoder 162 according to some embodiments. Referring to FIG. 4, in some embodiments, the decoder 162 includes a processor 402, a program storage device 404 and a data storage device 406. The program storage device 404 and the data storage device 406 may each be coupled to the processor 402. The processor 402 may include, but is not limited to, for example, a general purpose processor (e.g., a general purpose microprocessor) and/or a digital signal processor (DSP). The program storage device 404 may store program instructions that may be executed by the processor to cause the processor 402 to perform image decoding in accordance with some embodiments, as described below. The data storage device 406 may store data and/or may be used as working memory and may include, but is not limited to, for example, random access memory (RAM). In some embodiments, the program storage device 404 stores data in addition to instructions. In some embodiments, the data storage device 406 stores instructions in addition to data. In some embodiments, a single storage device serves as the program storage device 404 and the data storage device 406.

In some embodiments, the decoder 162 may be implemented as an application specific integrated circuit (ASIC) configured to perform image decoding in accordance with some embodiments, as described below.

Figure 5:
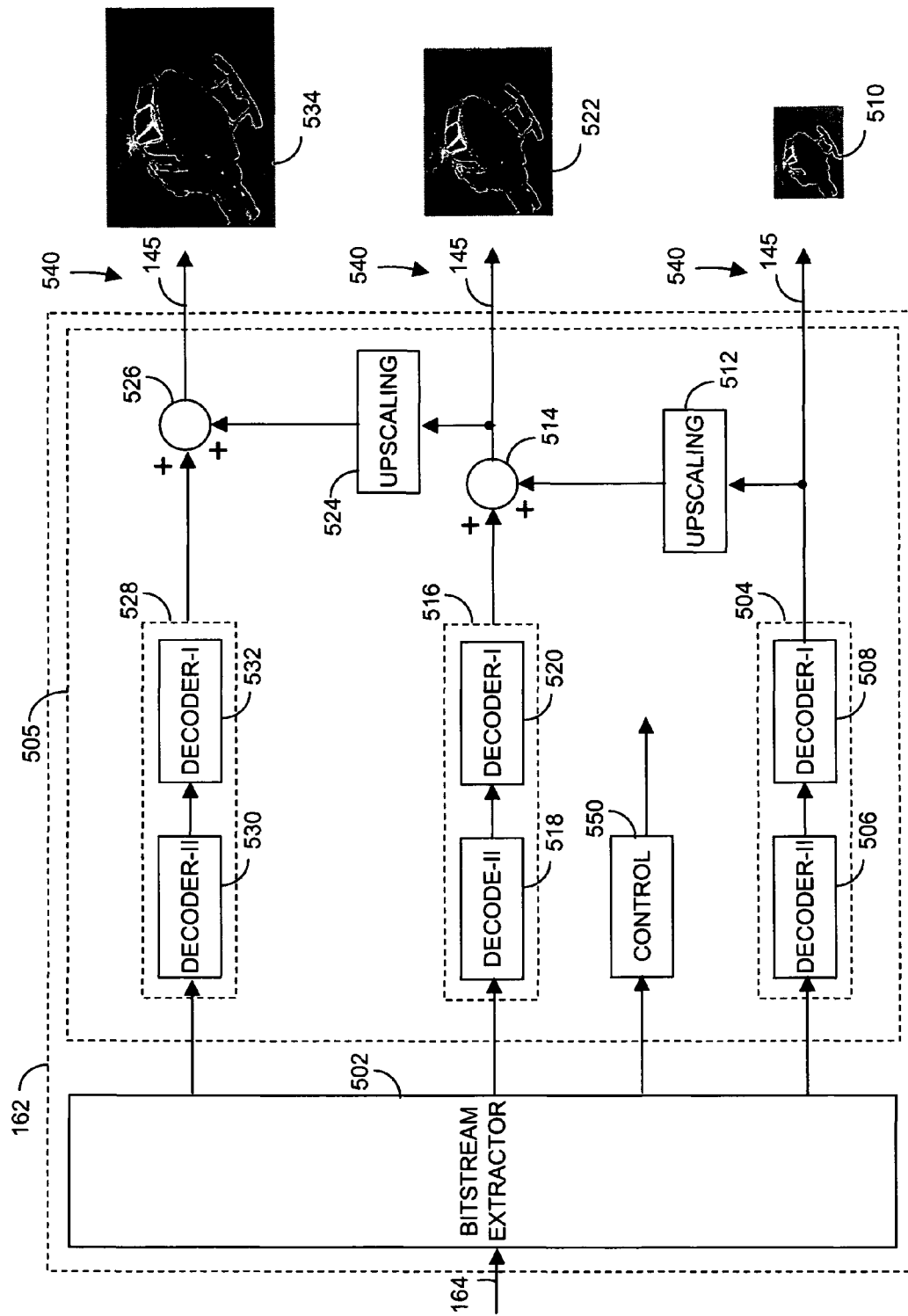
FIG. 5 is a functional block diagram of the decoder of FIG. 1, according to some embodiments.

FIG. 5 is a functional block diagram of the decoder 162 in accordance with some embodiments. Referring to FIG. 5, in some embodiments, the decoder 162 includes a bitstream extractor 502 having an input that receives a bitstream supplied from a suitable media source, for example, the coder 150 illustrated in FIG. 3. The bitstream may include coded image data. The coded image data may include a first portion representing a base or first layer, a second portion representing a second layer and a third portion representing a third layer.

The bitstream extractor 502 may extract the base or first layer, the second layer, and the third layer from the bitstream. A first output of the bitstream extractor 502 may supply the base or first layer of the coded image data. A second output may supply the second layer of the coded image data. A third output may supply the third layer of the coded image data.

The base or first layer, i.e., layer 0, of the coded image data may be supplied to an input of a first decoder 504 of a decoder subsystem 505. The first decoder 504 may provide decoding in accordance with one or more video coding standards, e.g., the AVC-H.264 video coding standard. In some embodiments, the first decoder 504 provides decoding in accordance with the same video coding standard(s) as the first encoder 312 (FIG. 3).

The first decoder 504 may include a first portion 506 and a second portion 508, which may provide decoding for lossless coding and decoding for lossy coding, respectively. The first portion 508 may include, but is not limited to, an entropy decoder, e.g., a Huffman decoder.

The output of the first decoder 504 may supply a first image data frame, sometimes referred to herein as a first reconstructed image data frame, indicated at 510. The first reconstructed image data frame 510 may have a first resolution, e.g., 176 pixels×120 pixels.

The first reconstructed image data frame 510 supplied by the first decoder 504 may be supplied to an input of a first upscaler 512, the output of which may supply a first predicted image data frame. The first upscaler 512 may provide upscaling, e.g., 2×2 upscaling, such that the first predicted image data frame has a second resolution, e.g., 352 pixels×240 pixels.

The first predicted image data frame supplied by the first upscaler 512 may be supplied to a first input of a first adder 514, a second input of which may receive an output from a second decoder 516. The second decoder 516 may receive the second layer, i.e., layer 1, of the coded image data, and may provide decoding in accordance with one or more video coding standards, e.g., the AVC-H.264 video coding standard. In some embodiments, the second decoder 516 provides decoding in accordance with the same video coding standard(s) as the first decoder 504 and/or the second encoder 326 (FIG. 3).

The second decoder 516 may include a first portion 518 and a second portion 520, which may provide decoding for lossless coding and decoding for lossy coding, respectively. The first portion 518 may include, but is not limited to, an entropy decoder, e.g., a Huffman decoder. The output of the second decoder 516 may supply a first decoded error image data frame. The first decoded error image data frame may have a resolution equal to the second resolution, e.g., 352 pixels×240 pixels.

The output of the first adder 514 may supply a second image data frame, sometimes referred to herein as a second reconstructed image data frame, indicated at 522. The second reconstructed image data frame 522 may have a resolution equal to the second resolution, e.g., 352 pixels×240 pixels.

The output of the first adder 514 may be supplied to an input of a second upscaler 524, the output of which may be a second predicted image data frame. The second upscaler 524 may provide upscaling, e.g., 2×2 upscaling, such that the second predicted image data frame has a third resolution, e.g., 704 pixels×480 pixels.

The second reconstructed image data frame 522 supplied by the second upscaler 524 may be supplied to a first input of a second adder 526, a second input of which may receive an output from a third decoder 528. The third decoder 528 may receive the third layer, i.e., layer 2, of the coded image data, and may provide decoding in accordance with one or more video coding standards, e.g., the AVC-H.264 video coding standard. In some embodiments, the third decoder 528 provides decoding in accordance with the same video coding standard(s) as the first decoder 504, the second decoder 516 and/or the third encoder 340 (FIG. 3).

The third decoder 528 may include a first portion 530 and a second portion 532, which may provide decoding for lossless coding and decoding for lossy coding, respectively. The first portion 530 may include, but is not limited to, an entropy decoder, e.g., a Huffman decoder.

The output of the third decoder 528 may supply a second decoded error image data frame. The second decoded error image data frame may have a resolution equal to the third resolution, e.g., 704 pixels×480 pixels.

The output of the second adder 526 may supply a third image data frame, sometimes referred to herein as a third reconstructed image data frame, indicated at 534. The third reconstructed image data frame 534 may have a resolution equal to the third resolution.

The decoder 162 has an output 540 that provides one or more of the reconstructed image data frames 510, 522, 534.

One or more of the reconstructed image data frames 510, 522, 534 may be supplied to one or more devices (e.g., one or more display devices and/or one or more storage devices). In some embodiments, for example, one of the reconstructed image data frames 510, 522, 534 may be supplied to a handheld device (e.g., a portable data assistant (PDA)), one of the reconstructed image data frames 510, 522, 534 may be supplied to a standard definition television (SDTV) and/or one of the reconstructed image data frames 510, 522, 534 may be supplied to a high definition television (HDTV).

In some embodiments, an image data frame having a resolution of 1920 pixels×1088 pixels (HD) has a different aspect ratio than image data frames having another resolution, e.g., 704 pixels×480 pixels (SD). For example, an image data frame for an HDTV may have an aspect ratio of 16:9. An image data frame for a SDTV may have an aspect ration of 4:3. Thus an image data frame for an HDTV may have areas, e.g., border areas that do not appear in an image data frame for an SDTV or other type of SD display devices. Consequently, in some embodiments, such areas are not processed with the rest of the image data frame. Rather the processing, in the coder 150 and/or in the decoder 162, of such areas may be separate, in at least some respect, from the other areas.

As stated above, the bitstream received by the decoder 162 may further include the bitstream characterization information supplied by the coder 150. If the bitstream includes bitstream characterization information, such information may also be extracted by the bitstream extractor, which may supply such information to a control section 550.

If the decoder 162 is programmable, the decoder 162 may control one or more of its characteristics based, at least in part, on the bitstream characterization information. In some embodiments, for example, the decoder 162 may (1) control one or more of the upscalers 512, 524, and/or one or more of the decoders 504, 516, 528 based at least in part on the bitstream characterization information, (2) determine to generate one or more of the reconstructed image data frames 510, 522, 534 based at least in part on the bitstream characterization information and/or (3) determine to supply a reconstructed image data frame 510, 522, 534 to a device based at least in part on the bitstream characterization information.

In some embodiments, the decoder 162 generates each of the reconstructed images 510, 522, 534 shown in FIG. 5. For example, some embodiments may configure the decoder 162 to generate each of the reconstructed images regardless of whether each of such reconstructed images is actually needed. Some embodiments may require the third reconstructed image, which requires that the first reconstructed image data frame and the second reconstructed image data frame also be generated.

In some embodiments, the decoder 162 generates less than all of the reconstructed images 510, 522, 534 shown in FIG. 5. For example, some embodiments may have no need for the second reconstructed image data frame 522 and/or the third reconstructed image data frame 536. In some such embodiments, the decoder 162 may have a configuration that does not provide the capability to generate the second reconstructed image data frame 522 and/or the third reconstructed image data frame 536. On the other hand, some embodiments may require image data frame(s) having a resolution greater than or equal to a reference resolution. If the resolution of the second reconstructed image data frame 522 is greater than or equal to the reference resolution, there may be no need to generate the third reconstructed image data frame 534. Moreover, if the resolution of the first reconstructed image data frame 510 is greater than or equal to the reference resolution, there may be no need to generate either the second reconstructed image data frame 522 or the third reconstructed image data frame 534.

The decoder 162 may or may not be programmable. In some embodiments, one or more characteristics of the decoder 162 are programmable. In some such embodiments, one or more of the upscalers 512, 524, are programmable. Moreover, in some embodiments, one or more of the decoders 504, 516, 528 are programmable.

Some embodiments may have a configuration that does not include one or more of the upscalers 512, 524 and/or decoders 504, 516, 528 and/or a configuration that includes one or more structures not employed in the decoder 162 of FIG. 3.

Figure 6:
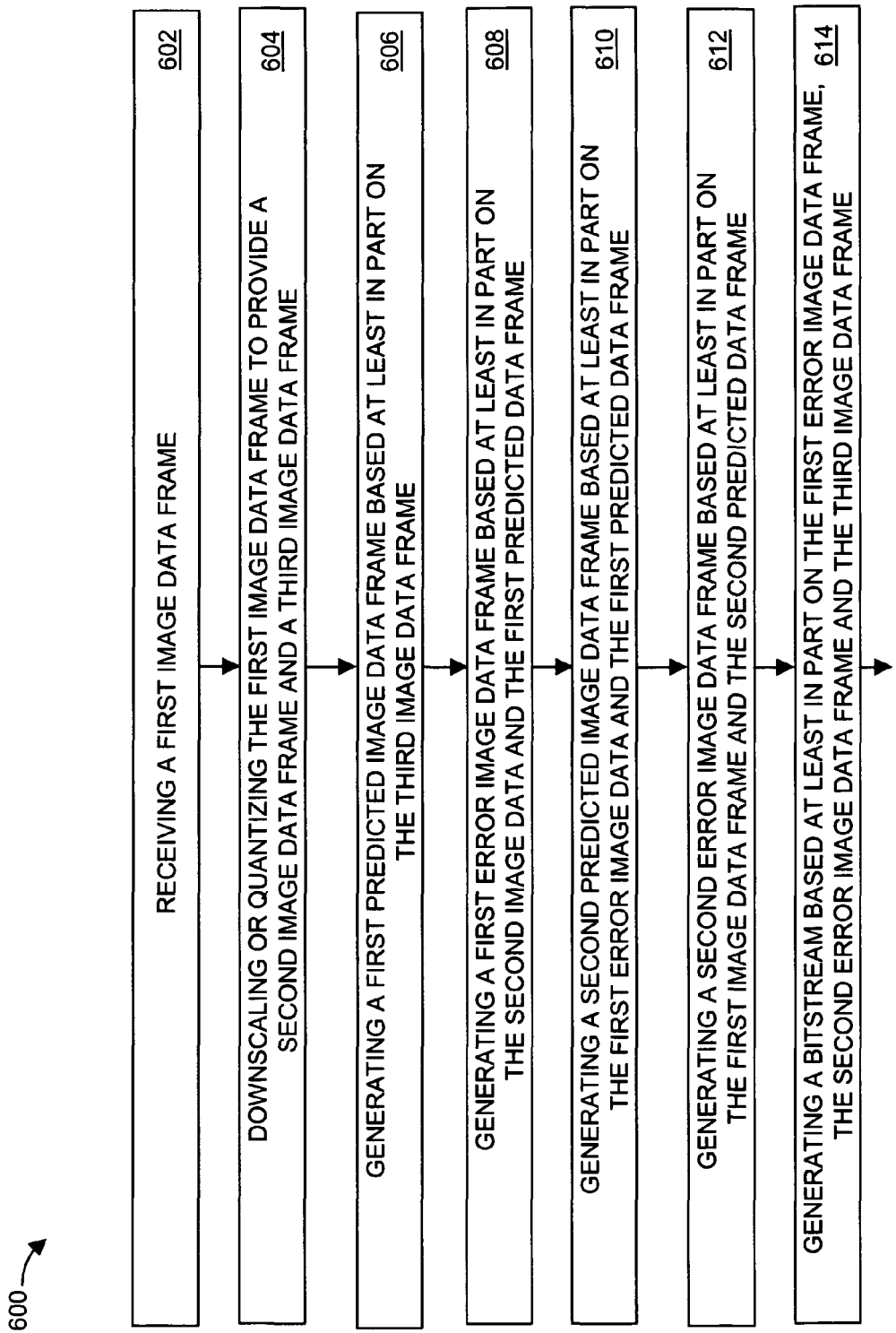
FIG. 6 is a flowchart of a method, according to some embodiments.

FIG. 6 is a flow chart 600 of a method according to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches.

At 602, a first image data frame is received. In some embodiments, the first data frame has a first resolution, e.g., 704 pixels×480 pixels, and is supplied from a source of media content, including, but not limited to, for example, an image capture device (e.g., a camera), an image storage and/or retrieval device (e.g., a digital video recorder (DVR) that might retrieve stored image information) and/or combinations thereof.

At 604, the first image data frame is downscaled or quantized to provide a second image data frame and a third image data frame. In some embodiments, the second image data frame has a second resolution, e.g., 352 pixels×240 pixels, and the third image data frame has a third resolution, e.g., 176 pixels×120 pixels.

At 606, a first predicted image data frame is generated based at least in part on the third image data frame. In some embodiments, the first predicted image data frame may be generated by encoding the third image data frame to provide an encoded third image data frame, decoding the encoded third image data frame to provide a decoded image data frame, and upscaling the decoded image data frame to provide the first predicted image data frame. In some embodiments, the first predicted image data frame has a resolution equal to the second resolution, e.g., 352 pixels×240 pixels.

At 608, a first error image data frame is generated based at least in part on the second image data frame and the first predicted image data frame. In some embodiments, the first error image data frame is generated by subtracting the first predicted image data frame from the second image data frame. In some embodiments, the first error image data frame has a resolution equal to the second resolution, e.g., 352 pixels×240 pixels At 610, a second predicted image data frame is generated based at least in part on the first error image data frame and the first predicted image data frame. In some embodiments, the second predicted image data frame is generated by encoding the first error image data frame to provide an encoded first error image data frame, decoding the encoded first error image data frame to provide a decoded error image data frame, adding the decoded error image data frame to the first predicted image data frame to provide an adjusted data frame, and upscaling the adjusted data frame to provide the second predicted image data frame. In some embodiments, second predicted image data frame has a resolution equal to the first resolution, e.g., 704 pixels×480 pixels.

At 612, a second error image data frame is generated based at least in part on the first image data frame and the second predicted image data frame. In some embodiments, the second error image data frame is generated by subtracting the second error image data frame from the first image data frame. In some embodiments, the second error image data frame has a resolution equal to the first resolution, e.g., 704 pixels×480 pixels.

At 614, a bitstream is generated based at least in part on the first error image data frame, the second error image data frame and the third image data frame. In some embodiments, the bitstream is generated by the separately encoding the first error image data frame, the second error image data frame and the third image data frame, and combining the encoded first error image data frame, the encoded second error image data frame and the encoded third image data frame into a bitstream. The bitstream may be packetized in accordance with one or more standards.

Figure 7:
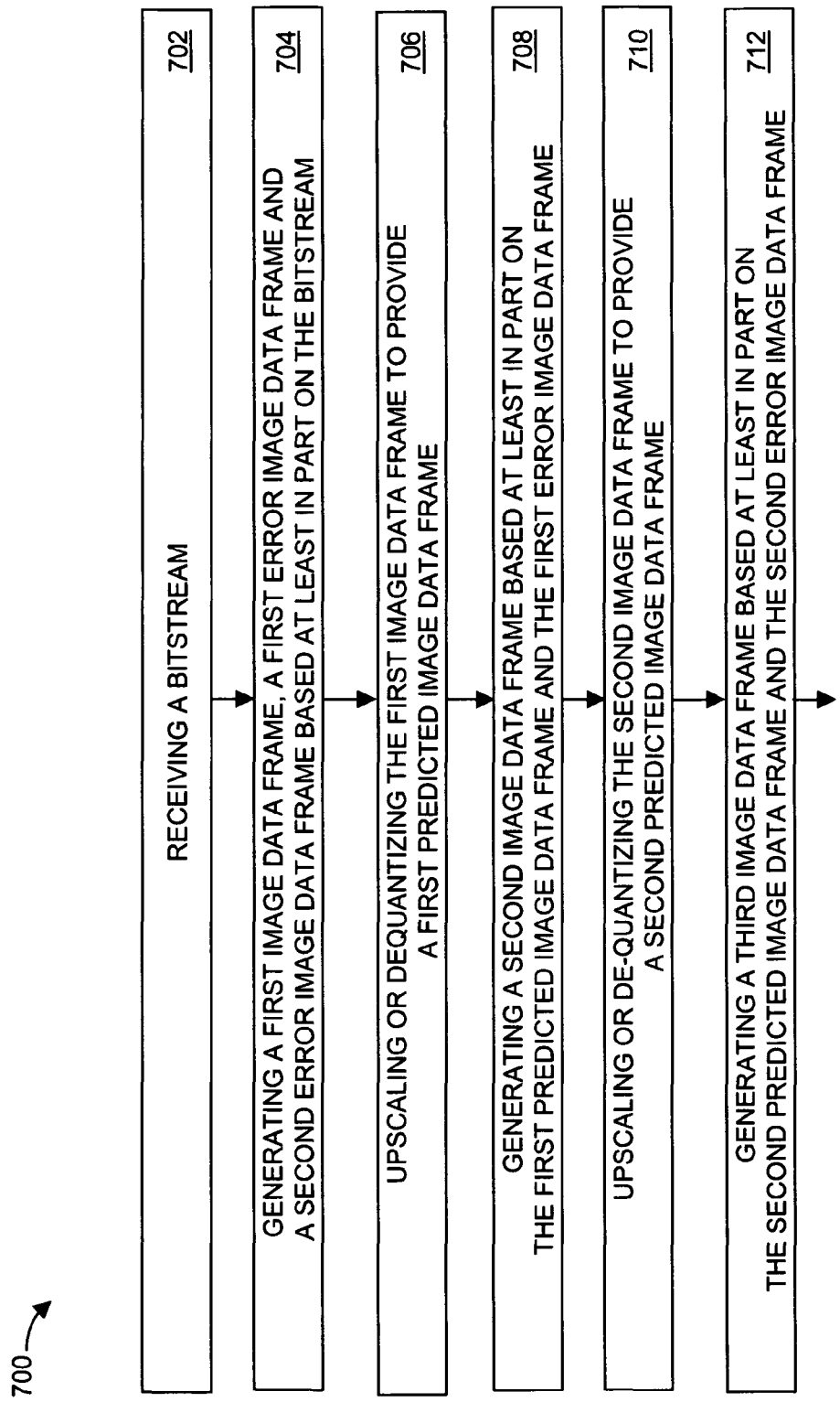
FIG. 7 is a flowchart of another method, according to some embodiments.

FIG. 7 is a flow chart 700 of a method according to some embodiments. Referring to FIG. 7, at 702, a bitstream is received. At 704, a first image data frame, first error image data frame and second error image data frame are generated based at least in part on the bitstream. In some embodiments, the bitstream includes coded image data, which may include a first portion representing a base or first layer, a second portion representing a second layer and a third portion representing a third layer. In some embodiments, the first image data frame is generated by extracting the base or first layer from the bitstream and decoding the extracted base or first layer. In some embodiments, the first error image data frame is generated by extracting the second layer from the bitstream and decoding the extracted second layer. In some embodiments, the second error image data frame is generated by extracting the third layer from the bitstream and decoding the extracted third layer. In some embodiments, the first image data frame has a first resolution, e.g., 176 pixels×120 pixels. In some embodiments, decoding is provided in accordance with one or more video coding standards.

At 706, the first image data frame is upscaled or de-quantized to provide a first predicted image data frame. In some embodiments, the first predicted image data frame has a second resolution, e.g., 352 pixels×240 pixels.

At 708, a second image data frame is generated based at least in part on the first predicted image data frame and the first error image data frame. In some embodiments, the second image data frame is generated by adding the first error image data frame to the first predicted image data frame. In some embodiments, the second image data frame has a resolution equal to the second resolution, e.g., 352 pixels×240 pixels.

At 710, the second image data frame is upscaled or de-quantized to provide a second predicted image data frame. In some embodiments, the second predicted image data frame has a third resolution, e.g., 704 pixels×480 pixels.

At 712, a third image data frame is generated based at least in part on the second predicted image data frame and the second error image data frame. In some embodiments, the third image data frame is generated by adding the second error image data frame to the second predicted image data frame.

Figure 8:
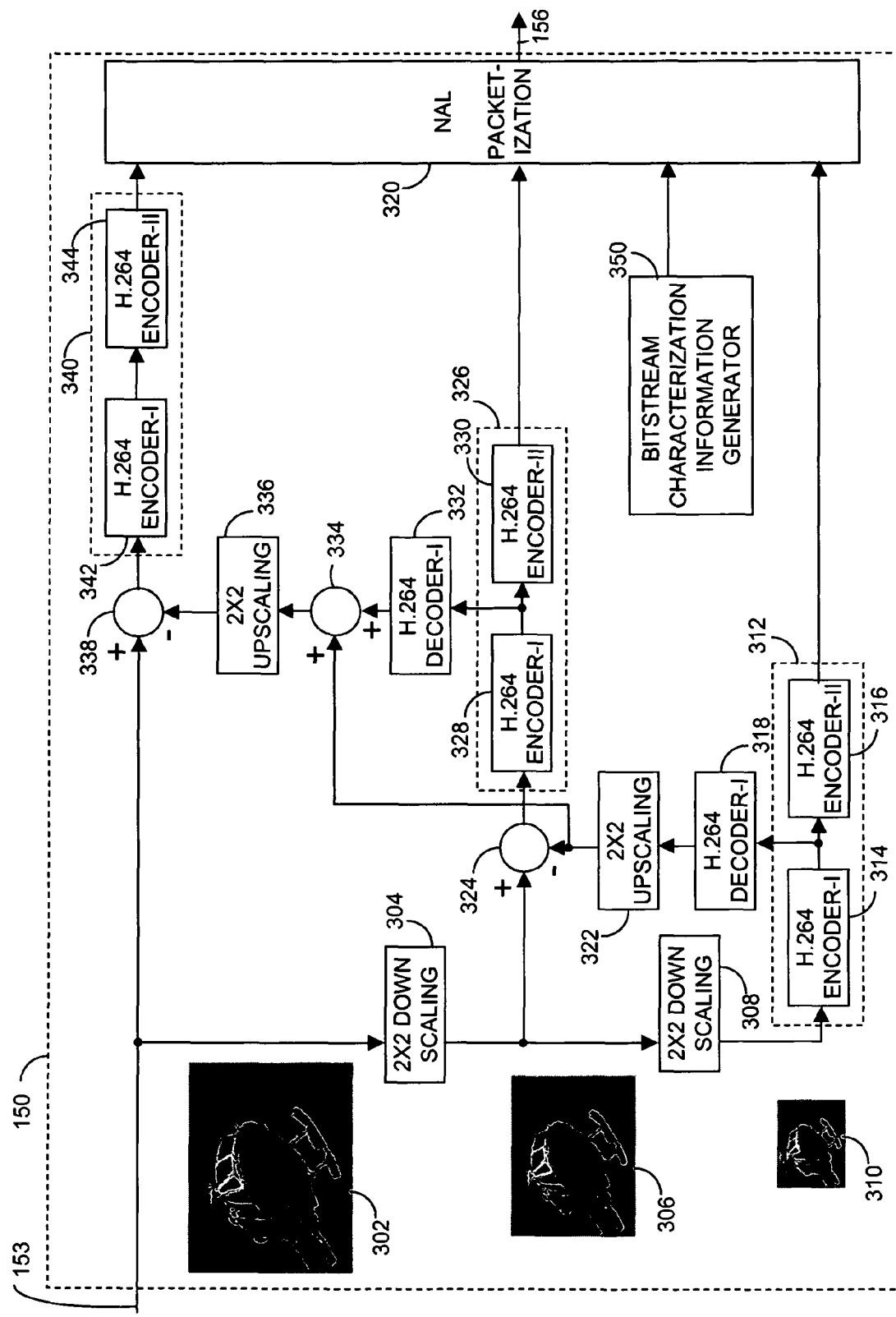
FIG. 8 is another functional block diagram of the coder of FIG. 1, according to some embodiments.

FIG. 8 is a functional block diagram of the coder 150 in accordance with some embodiments. Referring to FIG. 8, as stated above, in some embodiments, the encoders 312, 326, 340 each provide coding in accordance with the AVC-H.264 video coding standard, and the decoders 318, 322 each provide decoding in accordance with the same video coding standard, e.g., the AVC-H.264 video coding standard. In addition, as stated above, in some embodiments, the downscalers 304, 308 each provide 2×2 downscaling and the upscalers 322, 336 may each provide 2×2 upscaling.

Figure 9:
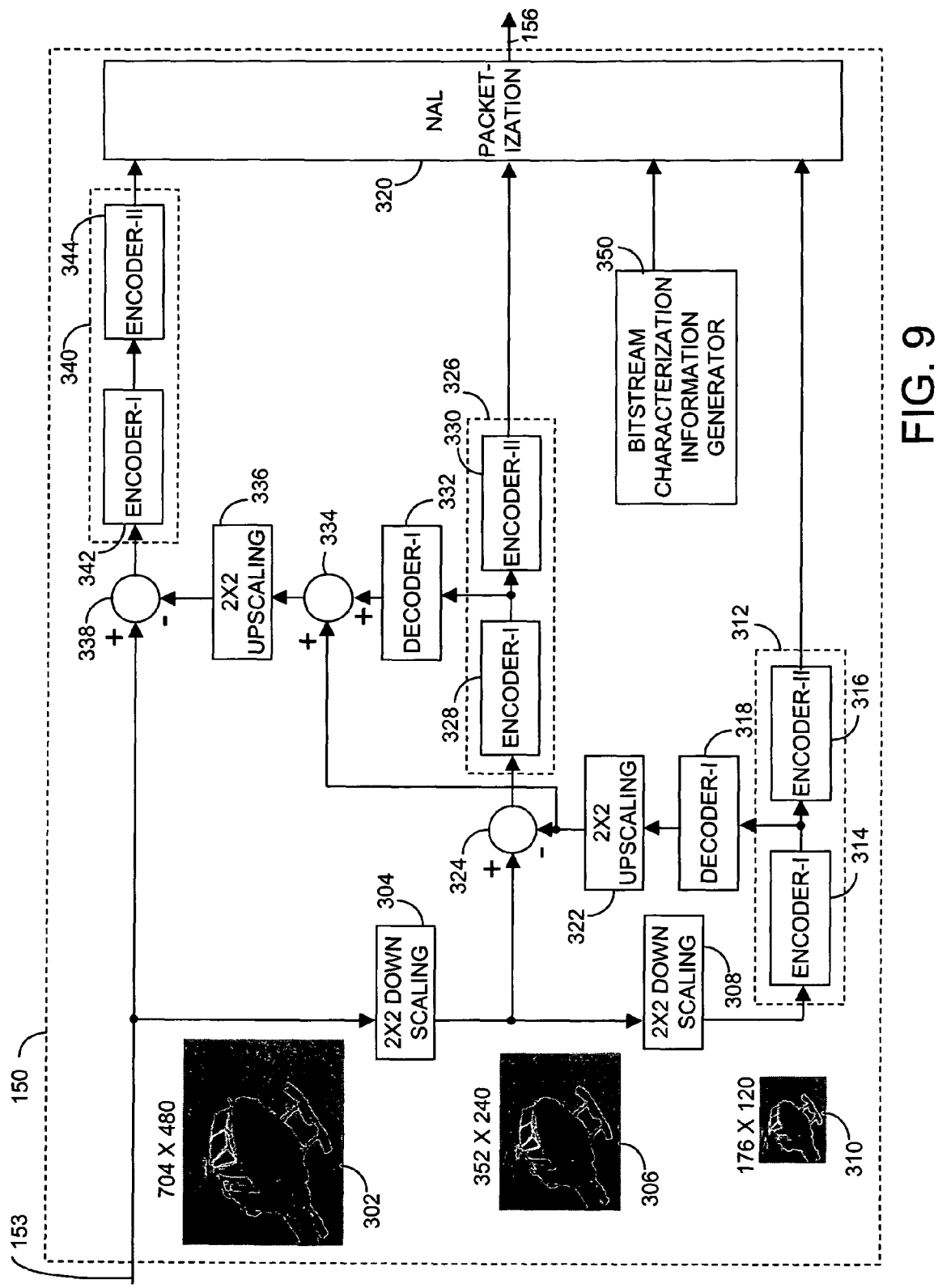
FIG. 9 is another functional block diagram of the coder of FIG. 1, according to some embodiments.

FIG. 9 is a functional block diagram of the coder 150 in accordance with some embodiments. Referring to FIG. 9, in some embodiments, the coder 150 receives an input or first image data frame 302 having a resolution of 704 pixels×480 pixels (i.e., standard definition (SD)). In some such embodiments, the downscalers 304, 308 may each provide 2×2 downscaling such that the second image data frame 306 has a resolution of 352 pixels×240 pixels (i.e., common interchange format (CIF)) and the third image data frame 310 has a resolution of 176 pixels×120 pixels (i.e., quarter common interchange format (QCIF)). The upscalers 322, 336 may each provide 2×2 upscaling.

Figure 10:
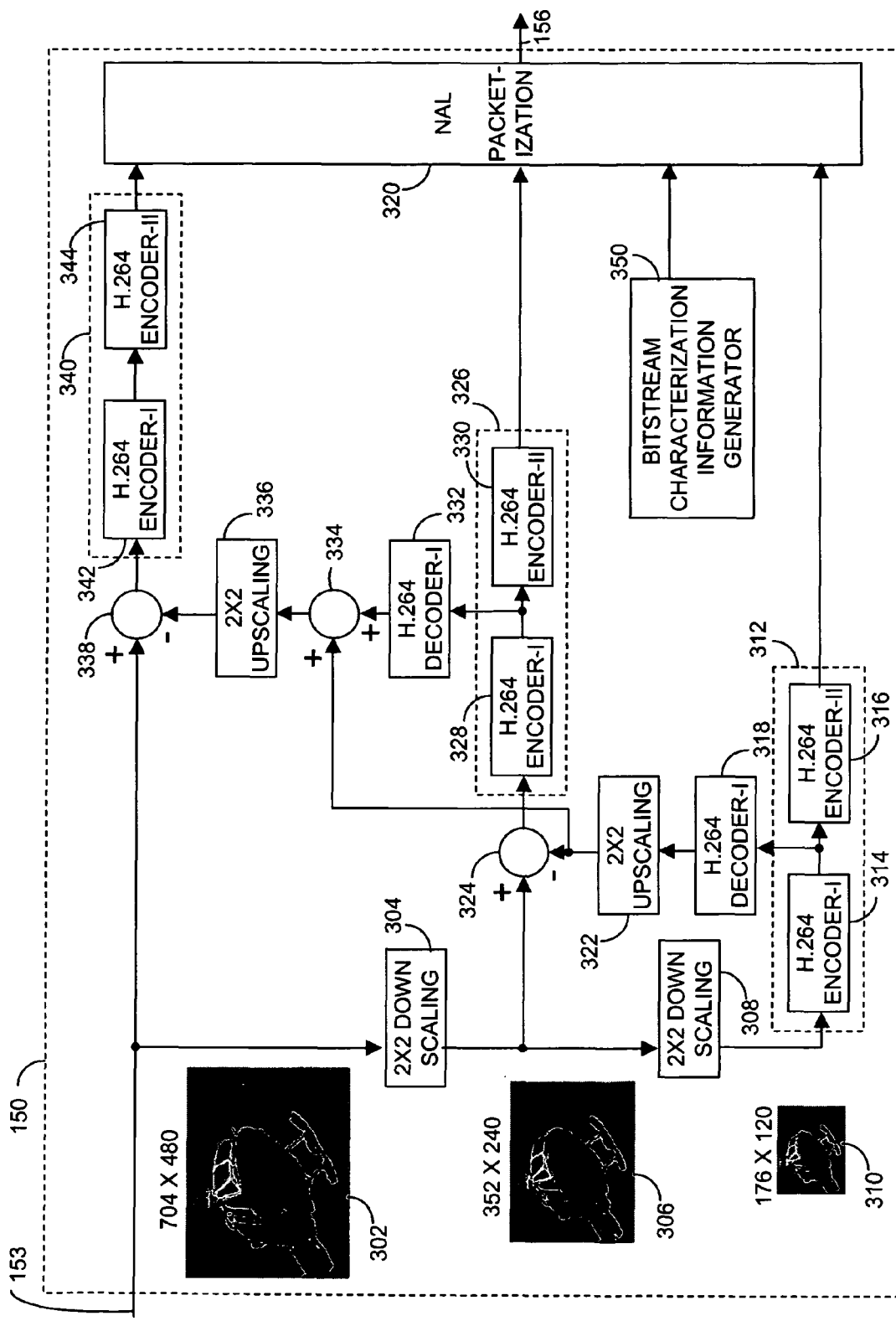
FIG. 10 is another functional block diagram of the coder of FIG. 1, according to some embodiments.

Referring to FIG. 10, in some such embodiments, the encoders 312, 326, 340 may each provide coding in accordance with the AVC-H.264 video coding standard, and the decoders 318, 322 may each provide decoding in accordance with the same video coding standard, e.g., the AVC-H.264 video coding standard.

Figure 11:
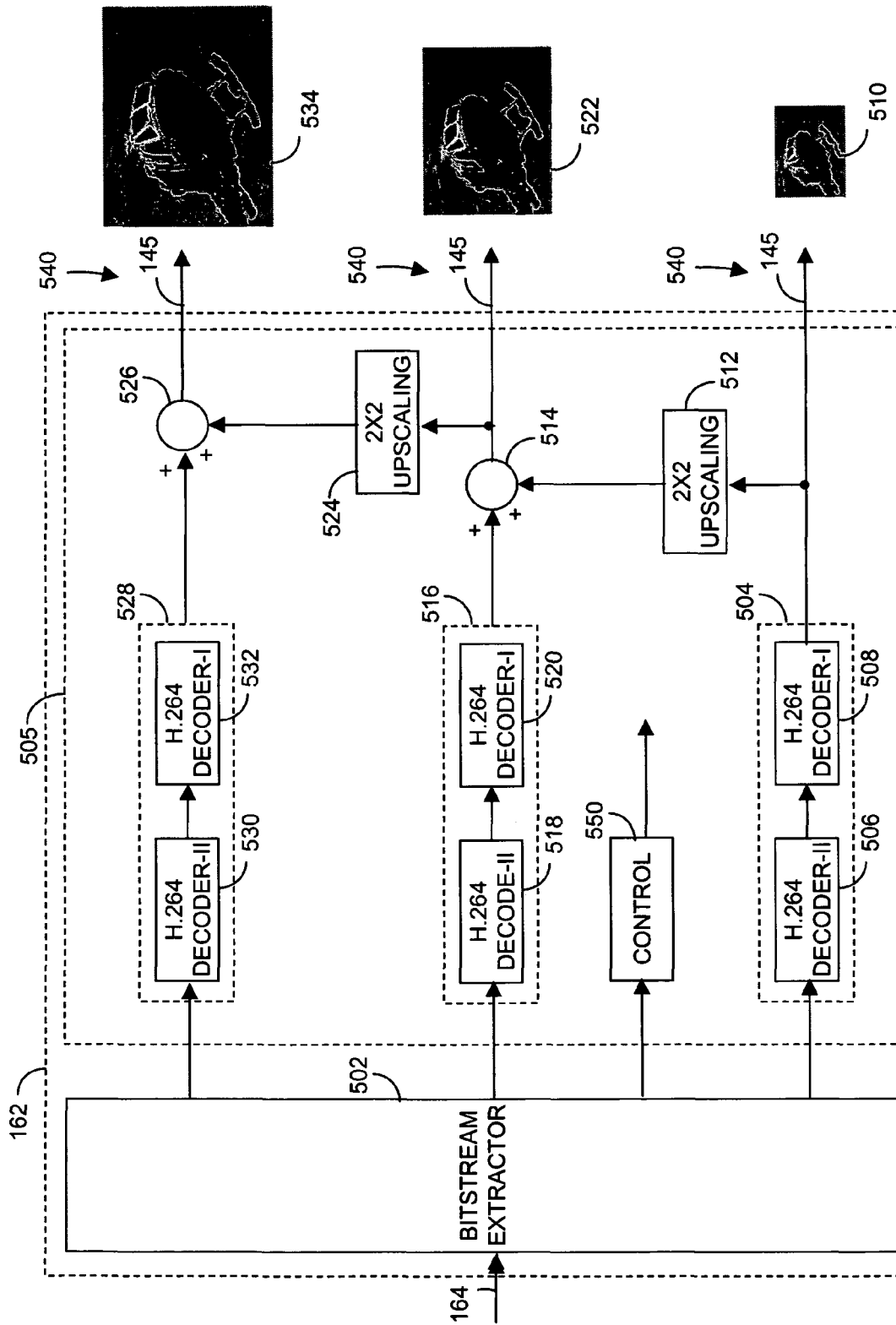
FIG. 11 is another functional block diagram of the decoder of FIG. 1, according to some embodiments.

FIG. 11 is a functional block diagram of the decoder 162 in accordance with some embodiments. Referring to FIG. 11, in some embodiments, the upscalers 512, 524 may each provide 2×2 upscaling. In addition, in some embodiments, the decoders 504, 516, 526 each provide coding in accordance with the AVC-H.264 video coding standard, and the decoders 318, 322 each provide decoding in accordance with the same video coding standard, e.g., the AVC-H.264 video coding standard.

As stated above, one or more of the reconstructed image data frames 510, 522, 534 may be supplied to one or more devices (e.g., one or more display devices and/or one or more storage devices). In some embodiments, for example, one of the reconstructed images 510, 522, 534 may be supplied to a handheld device (e.g., a portable data assistant (PDA)), one of the reconstructed images 510, 522, 534 may be supplied to a standard definition television (SDTV) and/or one of the reconstructed images 510, 522, 534 may be supplied to a high definition television (HDTV).

For example, if the bitstream generated by the coder 150 of FIG. 10 is supplied to the decoder 162 of FIG. 11, the first reconstructed image data frame 510 has a resolution of 176 pixels×120 pixels (QCIF), the second reconstructed image data frame 522 has a resolution of 352 pixels×240 pixels (CIF) and the third reconstructed image data frame 534 has a resolution of 1704 pixels×480 pixels (SD). In such embodiment, the first reconstructed image data frame 510 and/or the second reconstructed image data frame 522 may be supplied to a handheld device (e.g., a PDA), the third reconstructed image data frame 534 may be supplied to a SDTV.

In some embodiments, the coder 150 of FIG. 10 receives an input or first image data frame 302 having a resolution of 1408 pixels×960 pixels. In some such embodiments, the downscalers 304, 308 may each provide 2×2 downscaling such that the second image data frame 306 has a resolution of 704 pixels×480 pixels (SD) and the third image data frame 310 has a resolution of 352 pixels×240 pixels (CIF).

If the bitstream generated by the coder 150 in such embodiments is supplied to the decoder 162 of FIG. 11, the first reconstructed image data frame 510 has a resolution of 352 pixels×240 pixels (CIF), the second reconstructed image data frame 522 has a resolution of 704 pixels×480 pixels (SD) and the third reconstructed image data frame 534 has a resolution of 1408 pixels×960 pixels. In such embodiment, the first reconstructed image data frame 510 may be supplied to a handheld device (e.g., a PDA), the second reconstructed image data frame 522 may be supplied to a SDTV, the third reconstructed image data frame 534 may be supplied to a HDTV.

In some embodiments, the coder 150 receives an input or first image data frame 302 having a resolution of 2816 pixels×1920 pixels. In some such embodiments, the downscalers 304, 308 may each provide 2×2 downscaling such that the second image data frame 306 has a resolution of 1408 pixels×960 pixels and the third image data frame 310 has a resolution of 704 pixels×480 pixels (SD).

If the bitstream generated by the coder 150 in such embodiments is supplied to the decoder 162 of FIG. 11, the first reconstructed image data frame 510 has a resolution of 704 pixels×480 pixels (SD), the second reconstructed image data frame 522 has a resolution of 1408 pixels×960 pixels and the third reconstructed image data frame 534 has a resolution of 2816 pixels×1920 pixels. In such embodiment, the first reconstructed image data frame 510 may be supplied to a SDTV and/or downscaled, e.g., 2×2 or 4×4 downscaling, and supplied to a handheld device (e.g., a PDA), the second reconstructed image data frame 522 and/or the third reconstructed image data frame 534 may be supplied to a HDTV.

Other resolutions, data coding standards and/or combinations thereof may also be employed. Thus, the coder 150 and/or the decoder 162 need not be limited to any particular resolutions, data coding standards and/or combinations thereof.

Figure 12:
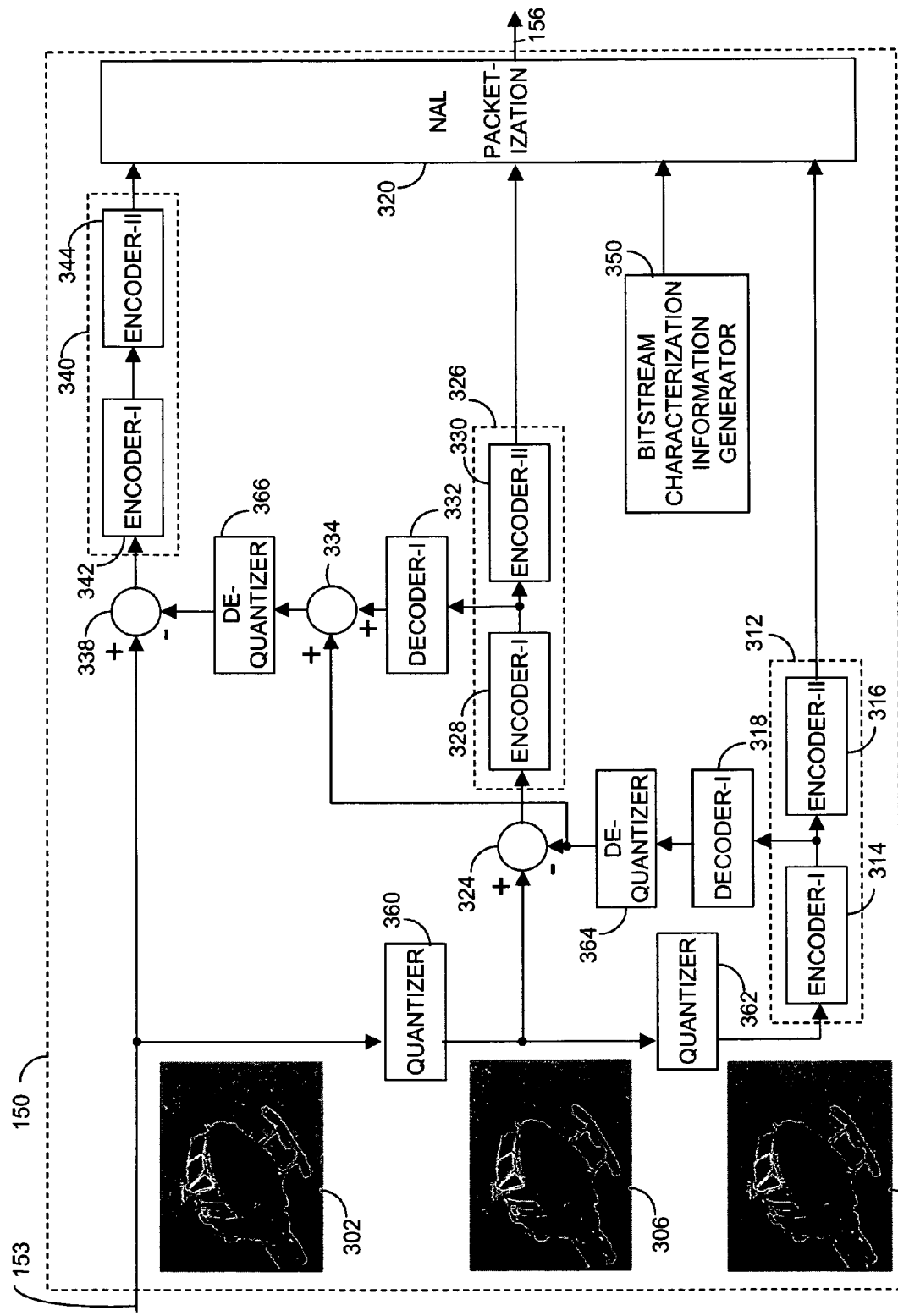
FIG. 12 is another functional block diagram of the coder of FIG. 1, according to some embodiments.

FIG. 12 is a functional block diagram of the coder 150 in accordance with some embodiments. Referring to FIG. 12, in some embodiments, the coder 150 includes first and second quantizers 360, 362 and first and second de-quantizers 364, 366 in place of the first and second downscalers 304, 308 and first and second upscalers 322, 336, respectively. The coder 150 may receive an input or first image data frame indicated at 302. The input image data frame 302 may have a first resolution, e.g., 1920 pixels×1088 pixels (i.e., high definition (HD)), and may be supplied from a source of media content, including, but not limited to, for example, an image capture device (e.g., a camera), an image storage device, an image retrieval device and/or combinations thereof (e.g., a digital video recorder (DVR) that might retrieve stored image information).

Each pixel of the input image data frame 302 may have a first resolution, e.g., 12 bits, resulting in a first quality, e.g., a high quality, for the first image data frame 302. The input image data frame 302 may be supplied to an input of the first quantizer 360, the output of which may supply a second image data frame indicated at 306. The first quantizer 362 may provide quantization, e.g., such that each pixel in the second image data frame 306 has a second resolution, e.g., 10 bits, that is less than the resolution of each pixel of the first image data frame 302 and such that the second image data frame 306 has a second quality, e.g., medium quality, that is less than the quality of the first image data frame 302. The total number of pixels in the second image data frame 306 may be the same as the total number of pixels in the first image data frame 302. Thus, the second image data frame 306 may have a resolution equal to the first resolution, e.g., 1920 pixels×1088 pixels (HD).

The second image data frame 306 may be supplied to an input of the second quantizer 362, the output of which may supply a third image data frame indicated at 310. The second quantizer 362 may provide quantization, e.g., such that each pixel in the third image data frame 310 has a third resolution, e.g., 8 bits, that is less than the resolution of each pixel of the second image data frame 306 and such that the third image data frame 310 has a third quality, e.g., regular quality, that is less than the quality of the second image data frame 306. The total number of pixels in the third image data frame 310 may be the same as the total number of pixels in the second image data frame 306. Thus, the third image data frame 310 may have a resolution equal to the first resolution, e.g., 1920 pixels×1088 pixels (HD).

The third image data frame 310 may be supplied to an input of the first encoder 312, which as stated above, may provide coding in accordance with one or more video coding standards, e.g., the AVC-H.264 video coding standard.

The output of the second portion 316 of the first encoder 312 may supply a coded image data frame, which may represent a first or base layer, i.e., layer 0, of a bitstream to be provided by the coder 150. The coded image data frame supplied by the second portion 316 may be supplied to the first input of the packetizer 320.

The output of the first portion 314 of the first encoder 312 may supply a coded image data frame, which may be supplied to a first decoder 318. As stated above, the first decoder 318 may provide decoding in accordance with one or more video coding standards, e.g., the AVC-H.264 video coding standard.

The output of the first decoder 318 may supply a first decoded image data frame, which may have a resolution equal to the first resolution, e.g., 1920 pixels×1088 pixels (HD). Each pixel of the first decoded image data frame may have a resolution equal to the third resolution, e.g., 8 bits.

The first decoded image data frame may be supplied to an input of the first de-quantizer 364, the output of which may supply a first predicted image data frame. The first de-quantizer 364 may provide de-quantization, e.g., by multiplying by a factor of four and/or some other technique, such that pixels in the first predicted image data frame have a resolution equal to the second resolution, e.g., 10 bits, although first predicted image data frame may have a resolution equal to the first resolution, e.g., 1920 pixels×1088 pixels (HD).

The first predicted image data frame supplied by the first de-quantizer 364 may be supplied to a first input of a first subtractor 324, a second input of which may receive the second image data frame 306. The first subtractor 324 may supply a first error image data frame, which may represent differences between the second image data frame 306 and the first predicted image data frame. The first error data frame may have a resolution equal to the first resolution, e.g., 1920 pixels×1088 pixels (HD). Pixels in the first error data frame may have a resolution equal to the second resolution, e.g., 10 bits.

The first error image data frame supplied by the first subtractor 324 may be supplied to an input of a second encoder 326, which as stated above, may provide coding in accordance with one or more video coding standards, e.g., the AVC-H.264 video coding standard.

The output of the second portion 330 of the second encoder 326 may supply a coded first error image data frame, which may represent a second layer, i.e., layer 1, of a bitstream to be provided by the coder 150. The coded first error image data frame supplied by the second portion 316 may be supplied to a second input of the packetizer 320.

The output of the first portion 314 of the second encoder 326 may supply a coded first error image data frame, which may be supplied to a second decoder 332. As stated above, the second decoder 332 may provide decoding in accordance with one or more video coding standards, e.g., the AVC-H.264 video coding standard.

The output of the second decoder 332 may supply a decoded error image data frame, which may have a resolution equal to the first resolution, e.g., 1920 pixels×1088 pixels (HD). Pixels in the decoded error image data frame may have a resolution equal to the second resolution, e.g., 10 bits.

The decoded error image data frame may be supplied to a first input of a first adder 334, a second input of which may receive the first predicted image data frame. The first adder 334 may supply an adjusted data frame, which may represent a combination of the decoded error image data frame and the first predicted image data frame. The adjusted data frame may have a resolution equal to the first resolution, e.g., 1920 pixels×1088 pixels (HD). Pixels in the adjusted data frame may have a resolution equal to the second resolution, e.g., 10 bits.

The adjusted data frame supplied by the first adder 334 may be supplied to an input of the second de-quantizer 366, the output of which may supply a second predicted image data frame. The second de-quantizer 366 may provide de-quantization, e.g., by multiplying by a factor of four and/or some other technique, such that pixels in the second predicted image data frame have a resolution equal to the first resolution, e.g., 12 bits, although the second predicted image data frame may have a resolution equal to the first resolution, e.g., 1920 pixels×1088 pixels (HD).

The second predicted image data frame supplied by the second de-quantizer 366 may be supplied to a first input of a second subtractor 338, a second input of which may receive the input or first image data frame 306. The second subtractor 338 may supply a second error image data frame, which may represent differences between the input or first image data frame 306 and the second predicted image data frame. The second error data frame may have a resolution equal to the first resolution, e.g., 1920 pixels×1088 pixels (HD). Pixels in the second error data frame may have a resolution equal to the first resolution, e.g., 10 bits.

The second error image data frame supplied by the second subtractor 338 may be supplied to an input of a third encoder 340, which may provide coding in accordance with one or more video coding standards, e.g., the AVC-H.264 video coding standard. In some embodiments, the third encoder 340 provides coding in accordance with the same video coding standard(s) as the first encoder 312 and/or the second encoder 326. In some embodiments, the third encoder 340 includes a first portion 342 and a second portion 344, which may provide lossy coding and lossless coding, respectively. The second portion 344 of the third encoder 340 may include, but is not limited to, an entropy encoder, e.g., a Huffman coder.

As stated above, in some embodiments, the encoders 312, 326, 340 may each provide coding in accordance with the AVC-H.264 video coding standard, and the decoders 318, 322 may each provide decoding in accordance with the same video coding standard, e.g., the AVC-H.264 video coding standard.

Figure 13:
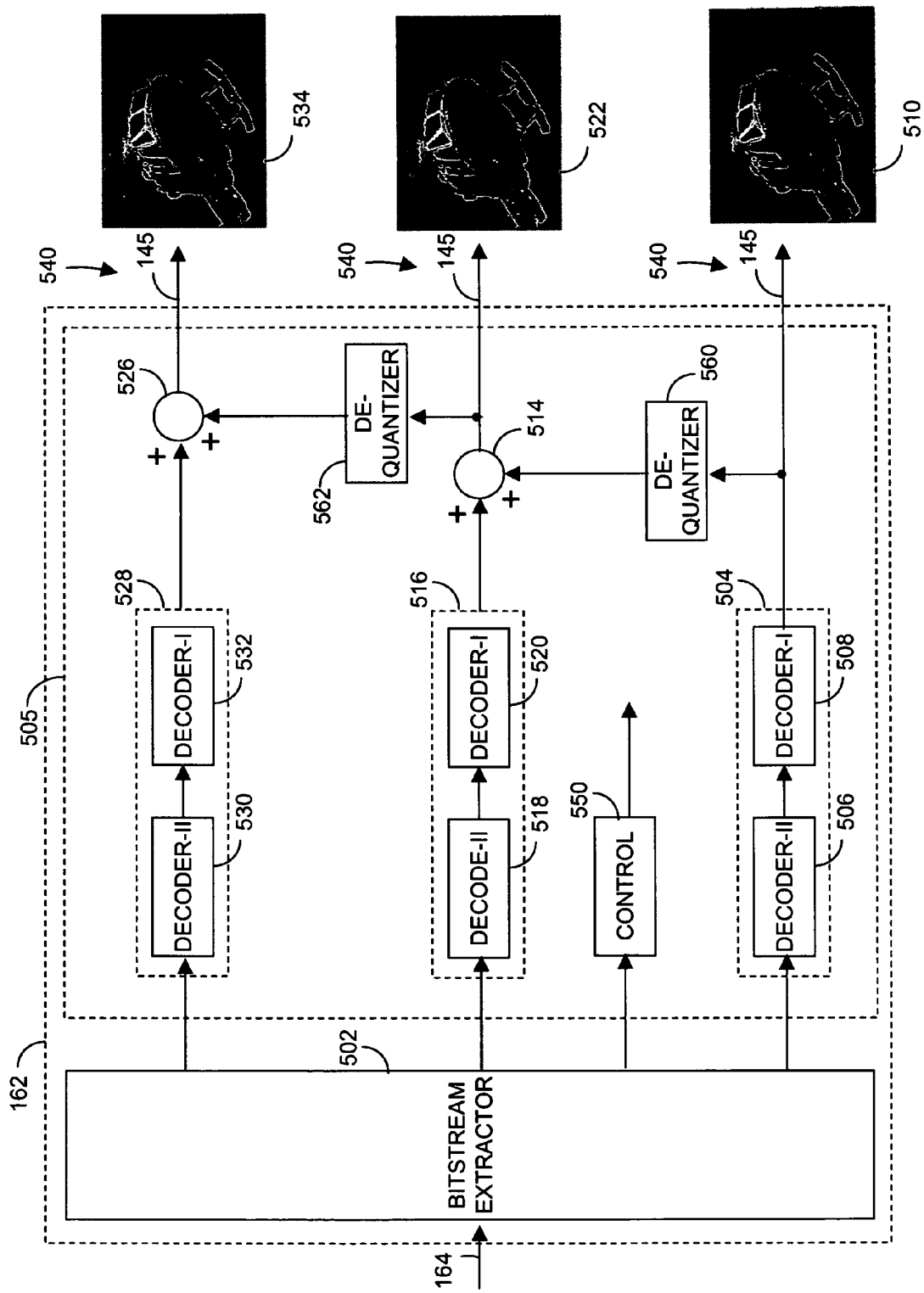
FIG. 13 is another functional block diagram of the decoder of FIG. 1, according to some embodiments.

FIG. 13 is a functional block diagram of the decoder 162 in accordance with some embodiments. Referring to FIG. 13, in some embodiments, the decoder 162 includes first and second de-quantizers 560, 562 in place of first and second upscalers 512, 524, respectively. The bitstream may be supplied to the input port of the extractor 502. The bitstream may include coded image data and may be supplied from any suitable source, including, but not limited to, for example, the coder 150 illustrated in FIG. 12. The coded image data may include a first portion representing a base or first layer, a second portion representing a second layer and a third portion representing a third layer.

The base or first layer, i.e., layer 0, of the coded image data may be supplied to the input of the first decoder 504, which as stated above, may provide decoding accordance with one or more video coding standards, e.g., the AVC-H.264 video coding standard. The output of the first decoder 504 may supply a first image data frame, sometimes referred to herein as a first reconstructed image data frame indicated, at 510. The first reconstructed image data frame 510 may have a first resolution that is equal to the resolution of the base or first layer, e.g., 1920 pixels×1088 pixels (HD). Pixels in the first reconstructed image data frame 510 may have a resolution equal to the resolution of pixels of the base or first layer, e.g., 8 bits.

The first reconstructed image data frame supplied by the first decoder 504 may be supplied to the input of the first de-quantizer 560, the output of which may supply a first predicted image data frame. The first de-quantizer 560 may provide de-quantization, e.g., by multiplying by a factor of four and/or some other technique, such that pixels in the first predicted image data frame may have a resolution equal to the resolution of pixels of the second layer, e.g., 10 bits, although first predicted image data frame may have a resolution equal to the first resolution, e.g., 1920 pixels×1088 pixels (HD).

The first predicted image data frame supplied by the first de-quantizer 560 may be supplied to the first input of the first adder 514, the second input of which may receive the output from the second decoder 516. The second decoder 516 may receive the second layer, i.e., layer 1, of the coded image data, which as stated above, may provide decoding in accordance with one or more video coding standards, e.g., the AVC-H.264 video coding standard.

The output of the second decoder 516 may supply a first decoded error image data frame. The first decoded error image data frame may have a resolution equal to the first resolution, e.g., 1920 pixels×1088 pixels (HD). Pixels in the first decoded error image data frame may have a resolution equal to the resolution of pixels of the second layer, e.g., 10 bits.

The output of the first adder 514 may supply a second image data frame, sometimes referred to herein as a second reconstructed image data frame, indicated at 522. The second reconstructed image data frame 522 may have a resolution equal to the first resolution, e.g., 1920 pixels×1088 pixels (HD). Pixels in the first decoded error image data frame may have a resolution equal to the resolution of pixels of the second layer, e.g., 10 bits.

The second reconstructed image data frame supplied by the first adder 514 may be supplied to an input of the second de-quantizer, 562 the output of which may be a second predicted image data frame. The second de-quantizer may provide de-quantization, e.g., by multiplying by a factor of four and/or some other technique, such that pixels in the first predicted image data frame may have a resolution equal to the resolution of pixels of the third layer, e.g., 12 bits, although second predicted image data frame may have a resolution equal to the first resolution, e.g., 1920 pixels×1088 pixels (HD).

The second predicted image data frame supplied by the second de-quantizer 562 may be supplied to the first input of the second adder 526, the second input of which may receive an output from the third decoder 528. The third decoder 528 may receive the third layer, i.e., layer 2, of the coded image data, and which as stated above, may provide decoding in accordance with one or more video coding standards, e.g., the AVC-H.264 video coding standard.

The output of the third decoder 528 may supply a second decoded error image data frame. The second decoded error image data frame may have a resolution equal to the first resolution, e.g., 1920 pixels×1088 pixels (HD). Pixels in the second decoded error image data frame may have a resolution equal to the resolution of pixels of the third layer, e.g., 12 bits.

The output of the second adder 526 may supply a third image data frame, sometimes referred to herein as a third reconstructed image data frame, indicated at 534. The third reconstructed image data frame 534 may have a resolution equal to the first resolution, e.g., 1920 pixels×1088 pixels (HD). Pixels in the third reconstructed image data frame may have a resolution equal to the resolution of pixels of the third layer, e.g., 12 bits.

One or more of the reconstructed image data frames 510, 522, 534 shown in FIG. 13 may be supplied to one or more devices (e.g., one or more display devices and/or one or more storage devices). In some embodiments, for example, one of the reconstructed images 510, 522, 534 may be supplied to a handheld device (e.g., a portable data assistant (PDA)), one of the reconstructed images 510, 522, 534 may be supplied to a standard definition television (SDTV) and/or one of the reconstructed images 510, 522, 534 may be supplied to a high definition television (HDTV).

In some embodiments, the decoder 162 generates each of the reconstructed images 510, 522, 534 shown in FIG. 13. For example, some embodiments may configure the decoder 162 to generate each of the reconstructed images regardless of whether each of such reconstructed images is actually needed. Some embodiments may require the third reconstructed image, which requires that the first reconstructed image data frame and the second reconstructed image data frame also be generated.

In some embodiments, the decoder 162 generates less than all of the reconstructed images 510, 522, 534 shown in FIG. 13. For example, some embodiments may have no need for the second reconstructed image data frame 522 and/or the third reconstructed image data frame 536. In some such embodiments, the decoder 162 may have a configuration that does not provide the capability to generate the second reconstructed image data frame 522 and/or the third reconstructed image data frame 536. On the other hand, some embodiments may require image data frame(s) having a resolution greater than or equal to a reference resolution. If the resolution of the second reconstructed image data frame 522 is greater than or equal to the reference resolution, there may be no need to generate the third reconstructed image data frame 534. Moreover, if the resolution of the first reconstructed image data frame 510 is greater than or equal to the reference resolution, there may be no need to generate either the second reconstructed image data frame 522 or the third reconstructed image data frame 534.

Figure 14:
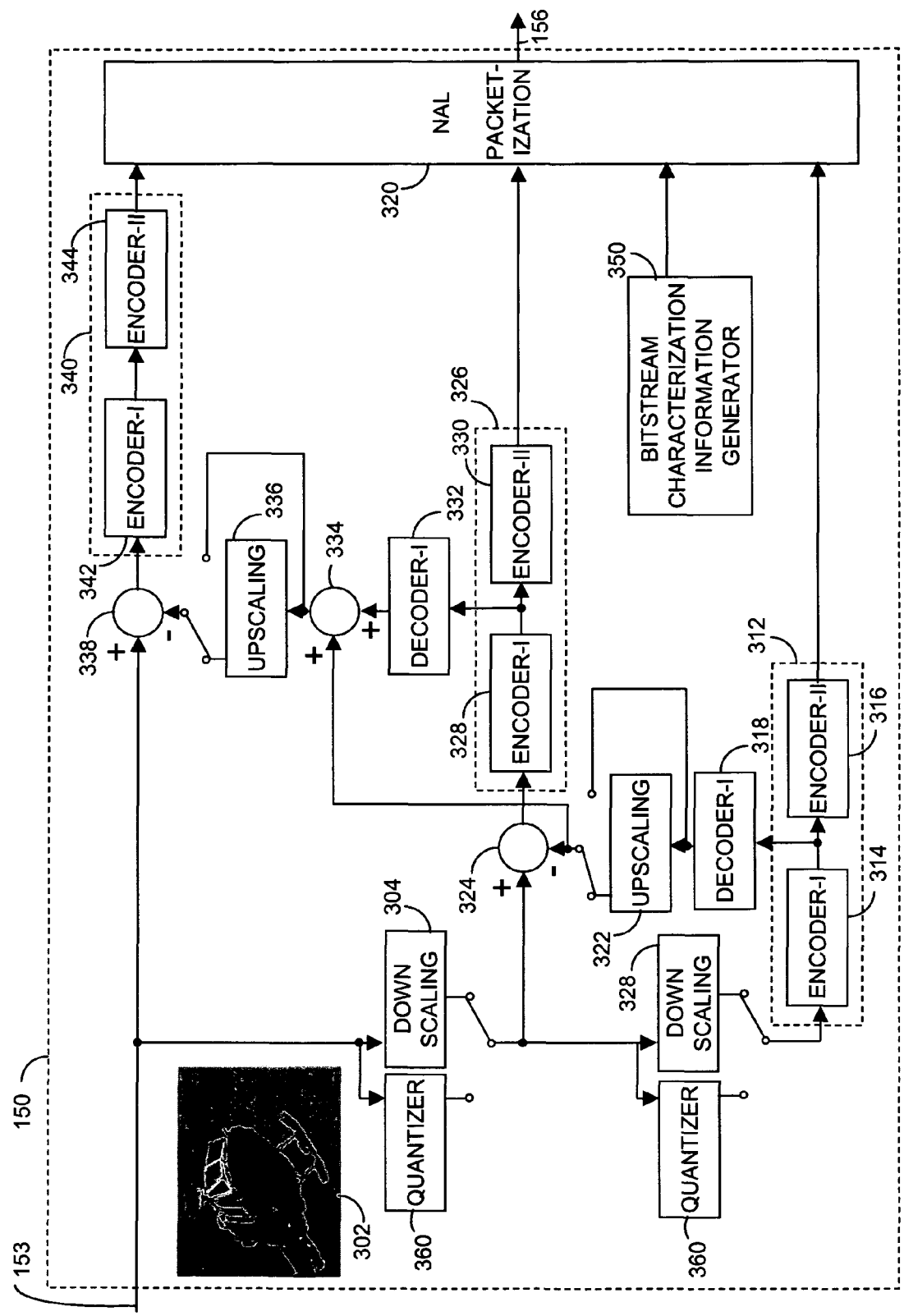
FIG. 14 is another functional block diagram of the coder of FIG. 1, according to some embodiments.

As stated above, in some embodiments, one or more characteristics of the coder 150 are programmable. FIG. 14 is a functional block diagram of the coder 150 in accordance with some embodiments. Referring to FIG. 14, in some embodiments, the coder 150 includes the first and second downscalers 304, 308, the first and second upscalers 322, 336, the first and second quantizers 360, 362, and the first and second de-quantizers 364, 366. In some embodiments, the coder 150 may receive and/or generate one or more control signals (not shown) to control the first and second downscalers 304, 308, the first and second upscalers 322, 336, the first and second quantizers 360, 362, and the first and second de-quantizers 364, 366 and/or switches coupled thereto.

FIG. 15 is a functional block diagram of the coder 150 and the decoder 162, in accordance with some embodiments. Referring to FIG. 15, in some embodiments, the coder 150 supplied a bitstream that is received at the bitstream extractor 502 of the decoder 162. The base or first layer, the second layer and the third layer are extracted from the bitstream. The base or first layer is supplied to a first decoder subsystem 505A, a second decoder subsystem 505B and a third decoder subsystem 505C. The second layer is supplied to the second decoder subsystem and the third decoder subsystem. The third layer is supplied to only the third layer. The first decoder subsystem 505A may process only the base or first layer and may generate a first reconstructed image data frame 510. The second decoder subsystem 505B may process only the base or first layer and the second layer and may generate a second reconstructed image data frame 522. The third decoder subsystem 505C may process the base or first layer, the second layer and may generate a third reconstructed image data frame 534.

Some embodiments of the coder 150 may have a configuration that does not include one or more of the downscalers 304, 308, upscalers 322, 326, encoders 312, 326, 344 and/or decoders 318, 332 and/or a configuration that includes one or more structures not employed in the coder 150 of FIGS. 3, 8-10, 12, 14. Some embodiments of the decoder 162 may have a configuration that does not include one or more of the upscalers 322, 326, encoders 312, 326, 344 and/or decoders 318, 332 and/or a configuration that includes one or more structures not employed in the coder 150 of FIGS. 5, 11, 13.

Thus, in some embodiments, a scalable bitstream may be employed even in association with devices that are not able to employ the JSVC video coding standard.

Unless otherwise stated, terms such as, for example, "based on" mean "based at least on", so as not to preclude being responsive to and/or based on, more than one thing. In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively.

The several embodiments described herein are solely for the purpose of illustration. Persons skilled in the art will recognize from this description other embodiments may be practiced with modifications and alterations limited only by the claims.

What is claimed is:

1. A method comprising:
   receiving a bitstream that includes coded image data;
   extracting, from the bitstream, a first layer of the coded image data, a second layer of the coded image data and a third layer of the coded image data;
   decoding the first layer of the coded image data to provide a first image data frame;
   decoding the second layer of the coded image data to provide a first error image data frame;
   decoding the third layer of the coded image data to provide a second error image data frame;
   upscaling or de-quantizing the first image data frame to provide a first predicted image data frame;
   generating a second image data frame based at least in part on the first predicted image data frame and the first error image data frame;
   upscaling or de-quantizing the second image data frame to provide a second predicted image data frame; and
   generating a third image data frame based at least in part on the second predicted image data frame and the second error image data frame;
   wherein the decoding the first layer of the coded image data to provide a first image data frame comprises providing a first decoder to decode the first layer to provide the first image data frame, the first decoder including a first portion and a second portion, the first portion providing decoding for lossless coding, the second portion providing decoding for lossy coding;
   wherein the decoding the second layer of the coded image data to provide a first error image data frame comprises providing a second decoder to decode the second layer to provide the first error image data frame, the second decoder including a first portion and a second portion the first portion of the second decoder providing decoding for lossless coding, the second portion of the second decoder providing decoding for lossy coding; and
   wherein the decoding the third layer of the coded image data to provide a second error image data frame comprises providing a third decoder to decode the third layer to provide the second error image data frame, the third decoder including a first portion and a second portion, the first portion of the third decoder providing decoding for lossless coding, the second portion of the third decoder providing decoding for lossy coding.

2. The method of claim 1 wherein upscaling or de-quantizing the first image data frame to provide a first predicted image data frame comprises:
   upscaling the first image data frame to provide the first predicted image data frame.

3. The method of claim 1 wherein upscaling or de-quantizing the first image data frame to provide a first predicted image data frame comprises:
   de-quantizing the first image data frame to provide the first predicted image data frame.

4. The method of claim 1 wherein generating a second image data frame based at least in part on the first predicted image data frame and the first error image data frame comprises:
   adding the first predicted image data frame to the first error image data frame to provide the second image data frame.

5. The method of claim 1 wherein upscaling or de-quantizing the second image data frame to provide a second predicted image data frame comprises:
   upscaling the second image data frame to provide the second predicted image data frame.

6. The method of claim 1 wherein upscaling or de-quantizing the second image data frame to provide a second predicted image data frame comprises:
de-quantizing the second image data frame to provide the second predicted image data frame.

7. The method of claim 1 wherein generating a third image data frame based at least in part on the second predicted image data frame and the second error image data frame comprises:
adding the second predicted image data frame to the second error image data frame to provide the third image data frame.

8. The method of claim 1 wherein each said decoding for lossless coding includes entropy decoding and wherein each said decoding for lossy coding comprises decoding in accordance with AVC-H.264 video coding standard.

9. The method of claim 1 wherein the decoding the first layer of the coded image data to provide a first image data frame further comprises:
supplying the first layer of the coded image data to the first portion of the first decoder, the first portion of the first decoder providing decoding for lossless coding to provide first decoded data; and
supplying the first decoded data from the first portion of the first decoder to the second portion of the first decoder, the second portion of the first decoder providing decoding for lossy coding to provide the first image data frame;
wherein the decoding the second layer of the coded image data to provide a first error image data frame further comprises:
supplying the second layer of the coded image data to the first portion of the second decoder, the first portion of the second decoder providing decoding for lossless coding to provide second decoded data; and
supplying the second decoded data from the first portion of the second decoder to the second portion of the second decoder, the second portion of the second decoder providing decoding for lossy coding to provide the first error image data frame; and
wherein the decoding the third layer of the coded image data to provide a second error image data frame further comprises:
supplying the third layer of the coded image data to the first portion of the third decoder, the first portion of the third decoder providing decoding for lossless coding to provide third decoded data; and
supplying the third decoded data from the first portion of the third decoder to the second portion of the third decoder, the second portion of the third decoder providing decoding for lossy coding to provide the second error image data frame.

10. A method comprising:
downscaling or quantizing a first image data frame to provide a second image data frame and a third image data frame;
encoding the third image data frame to provide an encoded third image data frame;
decoding the encoded third image data frame to provide a decoded image data frame;
upscaling the decoded image data frame to provide the first predicted image data frame;
generating a first error image data frame based at least in part on the second image data frame and the first predicted image data frame;
encoding the first error image data frame to provide an encoded first error image data frame;
decoding the encoded first error image data frame to provide a decoded error image data frame;
adding the decoded error image data frame to the first predicted image data frame to provide an adjusted data frame; and
upscaling the adjusted data frame to provide the second predicted image data frame;
generating a second error image data frame based at least in part on the first image data frame and the second predicted image data frame; and
generating a bitstream based at least in part on the first error image data frame, the second error image data frame and the third image data frame;
wherein the encoding the third image data frame to provide an encoded third image data frame comprises providing a first encoder to encode the third image data frame to provide the encoded third image data frame, the first encoder including a first portion and a second portion, the first portion providing lossy encoding, the second portion providing lossless encoding; and
wherein the encoding the first error image data frame to provide an encoded first error image data frame comprises providing a second encoder to encode the first error image data frame to provide an encoded first error image data frame, the second encoder including a first portion and a second portion, the first portion of the second encoder providing loss encoding, the second portion of the second encoder providing lossless encoding.

11. An apparatus comprising:
a non-transitory storage medium having stored therein instructions that when executed by a machine result in the following:
receiving a bitstream that includes coded image data;
extracting, from the bitstream, a first layer of the coded image data, a second layer of the coded image data and a third layer of the coded image data;
decoding the first layer of the coded image data to provide a first image data frame;
decoding the second layer of the coded image data to provide a first error image data frame;
decoding the third layer of the coded image data to provide a second error image data frame;
upscaling or de-quantizing the first image data frame to provide a first predicted image data frame;
generating a second image data frame based at least in part on the first predicted image data frame and the first error image data frame;
upscaling or de-quantizing the second image data frame to provide a second predicted image data frame; and
generating a third image data frame based at least in part on the second predicted image data frame and the second error image data frame;
wherein the decoding the first layer of the coded image data to provide a first image data frame comprises providing a first decoder to decode the first layer to provide the first image data frame, the first decoder including a first portion and a second portion, the first portion providing decoding for lossless coding, the second portion providing decoding for lossy coding;
wherein the decoding the second layer of the coded image data to provide a first error image data frame comprises providing a second decoder to decode the second layer to provide the first error image data frame, the second decoder including a first portion and a second portion, the first portion of the second decoder providing decoding for lossless coding, the second portion of the second decoder providing decoding for lossy coding; and wherein the decoding the third layer of the coded image data to provide a second error image data frame comprises providing a third decoder to decode the third layer to provide the second error image data frame, the third decoder including a first portion and a second portion, the first portion of the third decoder providing decoding for lossless coding, the second portion of the third decoder providing decoding for lossy coding.

12. The apparatus of claim 11 wherein upscaling or de-quantizing the first image data frame to provide a first predicted image data frame comprises:
   upscaling the first image data frame to provide the first predicted image data frame.

13. The apparatus of claim 11 wherein upscaling or de-quantizing the first image data frame to provide a first predicted image data frame comprises:
   de-quantizing the first image data frame to provide the first predicted image data frame.

14. The apparatus of claim 11 wherein generating a second image data frame based at least in part on the first predicted image data frame and the first error image data frame comprises:
   adding the first predicted image data frame to the first error image data frame to provide the second image data frame.

15. The apparatus of claim 11 wherein upscaling or de-quantizing the second image data frame to provide a second predicted image data frame comprises:
   upscaling the second image data frame to provide the second predicted image data frame.

16. The apparatus of claim 11 wherein upscaling or de-quantizing the second image data frame to provide a second predicted image data frame comprises:
   de-quantizing the second image data frame to provide the second predicted image data frame.

17. The apparatus of claim 11 wherein generating a third image data frame based at least in part on the second predicted image data frame and the second error image data frame comprises:
   adding the second predicted image data frame to the second error image data frame to provide the third image data frame.

18. The apparatus of claim 11 wherein each said decoding for lossless coding includes entropy decoding and wherein each said decoding for lossy coding comprises decoding in accordance with AVC-H.264 video coding standard.

19. The apparatus of claim 11 wherein the decoding the first layer of the coded image data to provide a first image data frame further comprises:
   supplying the first layer of the coded image data to the first portion of the first decoder, the first portion of the first decoder providing decoding for lossless coding to provide first decoded data; and
   supplying the first decoded data from the first portion of the first decoder to the second portion of the first decoder, the second portion of the first decoder providing decoding for lossy coding to provide the first image data frame;
   wherein the decoding the second layer of the coded image data to provide a first error image data frame further comprises:
      supplying the second layer of the coded image data to the first portion of the second decoder, the first portion of the second decoder providing decoding for lossless coding to provide second decoded data; and
      supplying the second decoded data from the first portion of the second decoder to the second portion of the second decoder, the second portion of the second decoder providing decoding for lossy coding to provide the first error image data frame; and
   wherein the decoding the third layer of the coded image data to provide a second error image data frame further comprises:
      supplying the third layer of the coded image data to the first portion of the third decoder, the first portion of the third decoder providing decoding for lossless coding to provide third decoded data; and
      supplying the third decoded data from the first portion of the third decoder to the second portion of the third decoder, the second portion of the third decoder providing decoding for lossy coding to provide the second error image data frame.

20. The apparatus of claim 11 wherein the received bitstream comprises the bitstream generated by the method of claim 10.

21. A system, comprising:
an input to receive a bitstream;
a decoder that includes a processor and is to:
   receive a bitstream that includes coded image data;
   extract, from the bitstream, a first layer of the coded image data, a second layer of the coded image data and a third layer of the coded image data;
   decode the first layer of the coded image data to provide a first image data frame;
   decode the second layer of the coded image data to provide a first error image data frame;
   decode the third layer of the coded image data to provide a second error image data frame;
   upscale or de-quantize the first image data frame to provide a first predicted image data frame,
   generate a second image data frame based at least in part on the first predicted image data frame and the first error image data frame,
   upscale or de-quantize the second image data frame to provide a second predicted image data frame, and
   generate a third image data frame based at least in part on the second predicted image data frame and the second error image data frame; and
an output to provide at least one image data frame from a group including the third image data frame, the second image data frame and the first image data frame;
wherein the decoder comprises a first decoder to decode the first layer to provide the first image data frame, the first decoder including a first portion and a second portion, the first portion to decode for lossless coding, the second portion to provide decode for lossy coding;
wherein the decoder further comprises a second decoder to decode the second layer to provide the first error image data frame, the second decoder including a first portion and a second portion the first portion of the second decoder to decode for lossless coding, the second portion of the second decoder to decode for lossy coding; and
wherein the decoder further comprises a third decoder to decode the third layer to provide the second error image data frame, the third decoder including a first portion and a second portion, the first portion of the third decoder to decode for lossless coding, the second portion of the third decoder to decode for lossy coding.

22. The system of claim 21 wherein upscaling or de-quantizing the first image data frame to provide a first predicted image data frame comprises:
  upscaling the first image data frame to provide the first predicted image data frame.

23. The system of claim 21 wherein upscaling or de-quantizing the first image data frame to provide a first predicted image data frame comprises:
  de-quantizing the first image data frame to provide the first predicted image data frame.

24. The system of claim 21 wherein generating a second image data frame based at least in part on the first predicted image data frame and the first error image data frame comprises:
  adding the first predicted image data frame to the first error image data frame to provide the second image data frame.

25. The system of claim 21 wherein upscaling or de-quantizing the second image data frame to provide a second predicted image data frame comprises:
  upscaling the second image data frame to provide the second predicted image data frame.

26. The system of claim 21 wherein upscaling or de-quantizing the second image data frame to provide a second predicted image data frame comprises:
  de-quantizing the second image data frame to provide the second predicted image data frame.

27. The system of claim 21 wherein generating a third image data frame based at least in part on the second predicted image data frame and the second error image data frame comprises:
  adding the second predicted image data frame to the second error image data frame to provide the third image data frame.

28. The system of claim 21 wherein each said decode for lossless coding includes entropy decoding and wherein each said decode for lossy coding comprises decoding in accordance with AVC-H.264 video coding standard.

29. The system of claim 21 wherein the first layer of the coded image data is supplied to the first portion of the first decoder, the first portion of the first decoder providing decoding for lossless coding to provide first decoded data, the first decoded data is supplied from the first portion of the first decoder to the second portion of the first decoder, the second portion of the first decoder providing decoding for lossy coding to provide the first image data frame;
  wherein the second layer of the coded image data is supplied to the first portion of the second decoder, the first portion of the second decoder providing decoding for lossless coding to provide second decoded data, the second decoded data is supplied from the first portion of the second decoder to the second portion of the second decoder, the second portion of the second decoder providing decoding for lossy coding to provide the first error image data frame; and
  wherein the third layer of the coded image data is supplied to the first portion of the third decoder, the first portion of the third decoder providing decoding for lossless coding to provide third decoded data, the third decoded data is supplied from the first portion of the third decoder to the second portion of the third decoder, the second portion of the third decoder providing decoding for lossy coding to provide the second error image data frame.

30. The system of claim 21 wherein the received bitstream comprises the bitstream generated by the method of claim 10.

31. The method of claim 1 wherein the received bitstream comprises the bitstream generated by the method of claim 10.

32. The method of claim 10 wherein downscaling or quantizing a first image data frame to provide a second image data frame and a third image data frame comprises:
  downscaling a first image data frame to provide a second image data frame and a third image data frame.

33. The method of claim 10 wherein downscaling or quantizing a first image data frame to provide a second image data frame and a third image data frame comprises:
  quantizing a first image data frame to provide a second image data frame and a third image data frame.

34. The method of claim 10 wherein generating a bitstream based at least in part on the first error image data frame, the second error image data frame and the third image data frame comprises:
  coding the first error image data frame, the second error image data frame and the third image data frame.

35. The method of claim 10 wherein each said encoding comprises lossy encoding and lossless encoding.

36. The method of claim 35 wherein each said decoding comprises decoding for lossless coding and decoding for lossy coding.

37. The method of claim 36 wherein each said lossy encoding comprises coding in accordance with AVC-H.264 video coding standard, wherein each said lossless encoding comprises entropy coding, wherein each said decoding for lossless coding includes entropy decoding and wherein each said decoding for lossy coding comprises decoding in accordance with AVC-H.264 video coding standard.

38. An apparatus comprising:
  a non-transitory storage medium having stored therein instructions that when executed by a machine result in the following:
    downscaling or quantizing a first image data frame to provide a second image data frame and a third image data frame;
    encoding the third image data frame to provide an encoded third image data frame;
    decoding the encoded third image data frame to provide a decoded image data frame;
    upscaling the decoded image data frame to provide the first predicted image data frame;
    generating a first error image data frame based at least in part on the second image data frame and the first predicted image data frame;
    encoding the first error image data frame to provide an encoded first error image data frame;
    decoding the encoded first error image data frame to provide a decoded error image data frame;
    adding the decoded error image data frame to the first predicted image data frame to provide an adjusted data frame; and
    upscaling the adjusted data frame to provide the second predicted image data frame;
    generating a second error image data frame based at least in part on the first image data frame and the second predicted image data frame; and
    generating a bitstream based at least in part on the first error image data frame, the second error image data frame and the third image data frame;
    wherein the encoding the third image data frame to provide an encoded third image data frame comprises providing a first encoder to encode the third image data frame to provide the encoded third image data frame, the first encoder including a first portion and a second portion, the first portion providing lossy encoding, the second portion providing lossless encoding; and wherein the encoding the first error image data frame to provide an encoded first error image data frame comprises providing a second encoder to encode the first error image data frame to provide an encoded first error image data frame, the second encoder including a first portion and a second portion, the first portion of the second encoder providing lossy encoding, the second portion of the second encoder providing lossless encoding.

39. A system, comprising:

an input to receive a bitstream;

an coder that includes a processor and is to:

downscale or quantize a first image data frame to provide a second image data frame and a third image data frame;

encode the third image data frame to provide an encoded third image data frame;

decode the encoded third image data frame to provide a decoded image data frame;

upscale the decoded image data frame to provide the first predicted image data frame;

generate a first error image data frame based at least in part on the second image data frame and the first predicted image data frame;

encode the first error image data frame to provide an encoded first error image data frame;

decode the encoded first error image data frame to provide a decoded error image data frame;

add the decoded error image data frame to the first predicted image data frame to provide an adjusted data frame; and upscale the adjusted data frame to provide the second predicted image data frame;

generate a second error image data frame based at least in part on the first image data frame and the second predicted image data frame; and generate a bitstream based at least in part on the first error image data frame, the second error image data frame and the third image data frame;

wherein the coder includes a first encoder to encode the third image data frame to provide the encoded third image data frame, the first encoder including a first portion and a second portion, the first portion providing lossy encoding, the second portion providing lossless encoding; and wherein the coder further comprises a second encoder to encode the first error image data frame to provide an encoded first error image data frame, the second encoder including a first portion and a second portion, the first portion of the second encoder providing lossy encoding, the second portion of the second encoder providing lossless encoding.

\* \* \* \* \*